United States Patent
Kita et al.

(10) Patent No.: US 6,323,300 B1
(45) Date of Patent: Nov. 27, 2001

(54) AROMATIC COPOLYMER AND COMPOSITION CONTAINING THE SAME

(75) Inventors: Kohei Kita, Nobeoka; Tsuneaki Tanabe, Fuji; Mitsuo Konishi, Okayama, all of (JP)

(73) Assignee: Asahi Kasei Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/308,589

(22) PCT Filed: Aug. 18, 1997

(86) PCT No.: PCT/JP97/02851

§ 371 Date: May 21, 1999

§ 102(e) Date: May 21, 1999

(87) PCT Pub. No.: WO98/23664

PCT Pub. Date: Jun. 4, 1998

(30) Foreign Application Priority Data

Nov. 25, 1996 (JP) .................................................... 8-313456
Mar. 12, 1997 (JP) .................................................... 9-057757

(51) Int. Cl.$^7$ .................................................... C08G 65/14
(52) U.S. Cl. .......................... 528/104; 528/485; 528/492; 525/132; 525/133; 428/423.1
(58) Field of Search .................................... 528/104, 485, 528/492; 525/132, 133; 428/423.1

(56) References Cited

U.S. PATENT DOCUMENTS

| | | |
|---|---|---|
| 3,390,125 | 6/1968 | Becker . |
| 3,392,147 | 7/1968 | Borman . |

FOREIGN PATENT DOCUMENTS

| | | |
|---|---|---|
| 1164738 | 9/1969 | (GB) . |
| 5523298 | 6/1980 | (JP) . |
| 5652043 | 12/1981 | (JP) . |
| 598291 | 2/1984 | (JP) . |

OTHER PUBLICATIONS

Die Makromol. Chem. 176, No. 5, 1349–1358 (1975).
J.M.S.—Pure Appl. Chem., A31(2), 155–169 (1994).
Journal of Polymer Sci., Part A–1, vol. 8, 1427–1438 (1970).
Journal of Polymer Sci., Part A–1, vol. 9, 663–675 (1971).
Journal of Polymer Sci., Part A, vol. 31, 1261–1273 (1993).

(List continued on next page.)

Primary Examiner—Duc Truong
(74) Attorney, Agent, or Firm—Birch, Stewart, Kolasch & Birch, LLP

(57) ABSTRACT

Disclosed is an aromatic copolymer comprising a plurality of aromatic copolymer chains, each comprising (A) recurring 2,6-diphenylphenol units and (B) phenolic comonomer units, each comonomer unit being independently selected from the group consisting of (i) an oxyphenylene monomer unit which is monosubstituted with a monovalent aromatic group or a halogen atom, (ii) an α-oxynaphthylene monomer unit, (iii) a β-oxynaphthylene monomer unit, and (iv) an oxyphenylene monomer unit which is substituted with at least one aliphatic group, wherein the amounts of (A) and (B) are from 50 to 98% by weight and from 2 to 50% by weight, based on the weight of the aromatic copolymer, provided that, when (iv) is present as the comonomer unit, the amount of (iv) is 20% by weight or less, based on the weight of (B), and wherein the aromatic copolymer has a weight average molecular weight of from 1,000 to 3,000, 000. A method for producing the aromatic copolymer is also disclosed. The aromatic copolymer of the present invention has excellent electrical characteristics (such as a low dielectric constant), an excellent heat resistance, excellent film-forming properties, low water absorption properties and an excellent adhesion to other materials, and can be advantageously used as a material for various electronic parts.

30 Claims, 4 Drawing Sheets

OTHER PUBLICATIONS

Journal of Polymer Sci., Part A, vol. 31, 1907–1909 (1993).
Journal of Polymer Sci., Part A–1, vol. 31, 2015–2029 (1993).
Macromolecules, vol. 3, No. 1, 101–107 (1970).
Macromolecules, vol. 3, No. 5, 533–535 (1970).
Macromolecules, vol. 4, No. 5, 642–648 (1971).
Kobunshi Ronbunshu, vol. 34, No. 5, 377–382 (1977).

AROMATIC COPOLYMER AND COMPOSITION CONTAINING THE SAME

This application is the national phase under 35 U.S.C. §371 of PCT International Application No. PCT/JP97/02851 which has an International filing date of Aug. 18, 1997 which designated the United Stated of America.

BACKGROUND OF THE INVENTION

1. Technical Field

The present invention relates to a novel aromatic copolymer. More particularly, the present invention is concerned with an aromatic copolymer comprising a plurality of aromatic copolymer chains, each comprising recurring 2,6-diphenylphenol units and specific phenolic comonomer units in a specific ratio, wherein the aromatic copolymer has a weight average molecular weight of from 1,000 to 3,000,000.

The aromatic copolymer of the present invention has excellent electrical characteristics (such as a low dielectric constant), low water absorption properties, an excellent heat resistance, excellent film-forming properties and an excellent adhesion to other materials, so that the aromatic copolymer of the present invention can be advantageously used as a material for an interlayer dielectric film for an LSI multilevel interconnect; a material for an LSI passivation film; a material for a substrate, such as a substrate for a printed circuit board, a ball grid array (BGA) and a multi chip module (MCM), and the like.

2. Background Art

A polymer used as a material for electric or electronic parts is required to have a high heat resistance, a low dielectric constant, low water absorption properties, an excellent adhesion to other materials and the like. Examples of polymers conventionally used as materials for electric or electronic parts include a phenolic resin, an epoxy resin, a polyimide resin, a fluoro resin, a bismaleimide resin and a polyphenylene ether resin. However, with respect to phenolic resins and epoxy resins, not only is the heat resistance low, but also the dielectric constant is disadvantageously high. Polyimide resins exhibit high heat resistance. However, polyimide resins exhibit high polarity, so that the water absorption properties thereof is high. Further, the dielectric constant thereof is disadvantageously high. Fluoro resins exhibit low dielectric constant and low water absorption properties, but have a poor adhesion to other materials. In recent years, the use of a bismaleimide resin and a polyphenylene ether resin as a material for a dielectric of a circuit board has been reported. These resins exhibit a low dielectric constant, but have a poor heat resistance. A silicon oxide film; which is currently used as a material for a dielectric of an LSI multilevel interconnect, is occasionally doped with fluorine so as to lower the dielectric constant thereof. However, there is a trade-off relationship between the dielectric constant and heat stability of a fluorine doped silicon oxide film, so that the lowering of the dielectric constant of the fluorine doped silicon oxide film is limited.

Among the polyphenylene ether resins, a poly-2,6-dimethylphenol, which is one of the engineering plastics, has been produced on a commercial scale and used in various fields. For example, a printed circuit board, which is based on a poly-2,6-dimethylphenol, is proposed. A poly-2,6-dimethylphenol resin has a low dielectric constant and low water absorption properties and, hence, this resin is useful as a material for electric or electronic parts. However, the heat resistance of this resin is not satisfactory, as compared to that of a polyimide resin or the like. The pendant methyl groups contained in a poly-2,6-dimethylphenol are likely to be oxidized by heating, and this is considered to be the reason for the poor heat resistance of a poly-2,6-dimethylphenol. In this situation, as a polyphenylene ether resin which has a high heat resistance as compared to that of a poly-2,6-dimethylphenol, a poly-2,6-diphenylphenol has been proposed and studied. It is known that this polymer exhibits a glass transition temperature of 230° C., a melting point of 480° C. and a thermal decomposition temperature of 515° C. and, therefore, this polymer is a highly potential material for electric or electronic parts {Makro-molecules, 4, 5, 643 (1971)}. However, a poly-2,6-diphenylphenol is a crystalline polymer, so that when this polymer is heated, crystallization of this polymer proceeds. Hence, when a film of a poly-2,6-diphenylphenol is formed for use as a dielectric layer for a circuit board, the film is likely to be disadvantageously deformed or crazed by the heating operation for the formation of the film or due to the heat produced during the use of the circuit board comprising the film as a dielectric layer. Even if the film does not suffer such deformation or crazing, the film is likely to be shrinked due to the heat produced during the use of the circuit board comprising the film as a dielectric layer, so that a disconnection or the like of the circuit of the circuit board is likely to be disadvantageously caused by a stress generated due to the shrinkage. Therefore, in order for a poly-2,6-diphenylphenol to be suitable for practical use, this resin needs to be rendered amorphous.

A typical example of a method for rendering a crystalline polymer amorphous is to lower the regularity of the structure of the polymer. The lowering of the regularity of the structure of a polymer can be achieved by using a technique of copolymerization or chemical modification. With respect to a poly-2,6-diphenylphenol, A. S. Hay et al. disclosed, in Journal of Polymer Sci., Part A, vol. 31, 2015 and the like, that an amorphous poly-2,6-diphenylphenol can be obtained by copolymerization of 2,6-diphenylphenol with a comonomer which is a derivative of 2,6-diphenylphenol in which the pendant benzene ring has a substituent. However, several steps of reactions are required for synthesizing such a comonomer, so that it is difficult to obtain a copolymer suitable for practical use. Further, most of such comonomers contain an aliphatic group or a fluorine atom, so that the synthesized copolymers cannot satisfy the required properties, such as a heat resistance, an adhesion to other materials and the like.

SUMMARY OF THE INVENTION

In this situation, the inventors have made extensive and intensive studies with a view toward developing an aromatic copolymer having an excellent heat resistance, excellent electrical characteristics (such as a low dielectric constant), low water absorption properties, excellent film-forming properties and an excellent adhesion to other substrate materials, which aromatic copolymer can be advantageously used as a material for electric or electronic parts. As a result, it has been unexpectedly found that, when 2,6-diphenylphenol is copolymerized with at least one specific phenolic comonomer, wherein 2,6-diphenylphenol and the phenolic comonomer are used in a specific ratio, a desired aromatic copolymer can be obtained, wherein the aromatic copolymer not only is substantially free of gel, but also has an excellent heat resistance, excellent electrical characteristics (such as a low dielectric constant), low water absorption properties, excellent film-forming properties and an excellent adhesion to other substrate materials. The present invention has been completed, based on the above novel finding.

Therefore, it is an object of the present invention to provide an aromatic copolymer which has an excellent heat resistance, excellent electrical characteristics (such as a low dielectric constant), low water absorption properties, excellent film-forming properties and an excellent adhesion to other substrate materials.

It is another object of the present invention to provide a method for producing the above-mentioned aromatic copolymer.

It is a further object of the present invention to provide a copolymer film formed from the above-mentioned aromatic copolymer and also provide a cross-linked copolymer film obtained by subjecting the copolymer film to crosslinking.

It is still a further object of the present invention to provide an electric or electronic part, which can be obtained using the above-mentioned copolymer film or crosslinked copolymer film.

The foregoing and other objects, features and advantages of the present invention will be apparent to those skilled in the art from the following detailed description and appending claims taken in connection with the accompanying drawings.

DETAILED DESCRIPTION OF THE INVENTION

Figure 1:
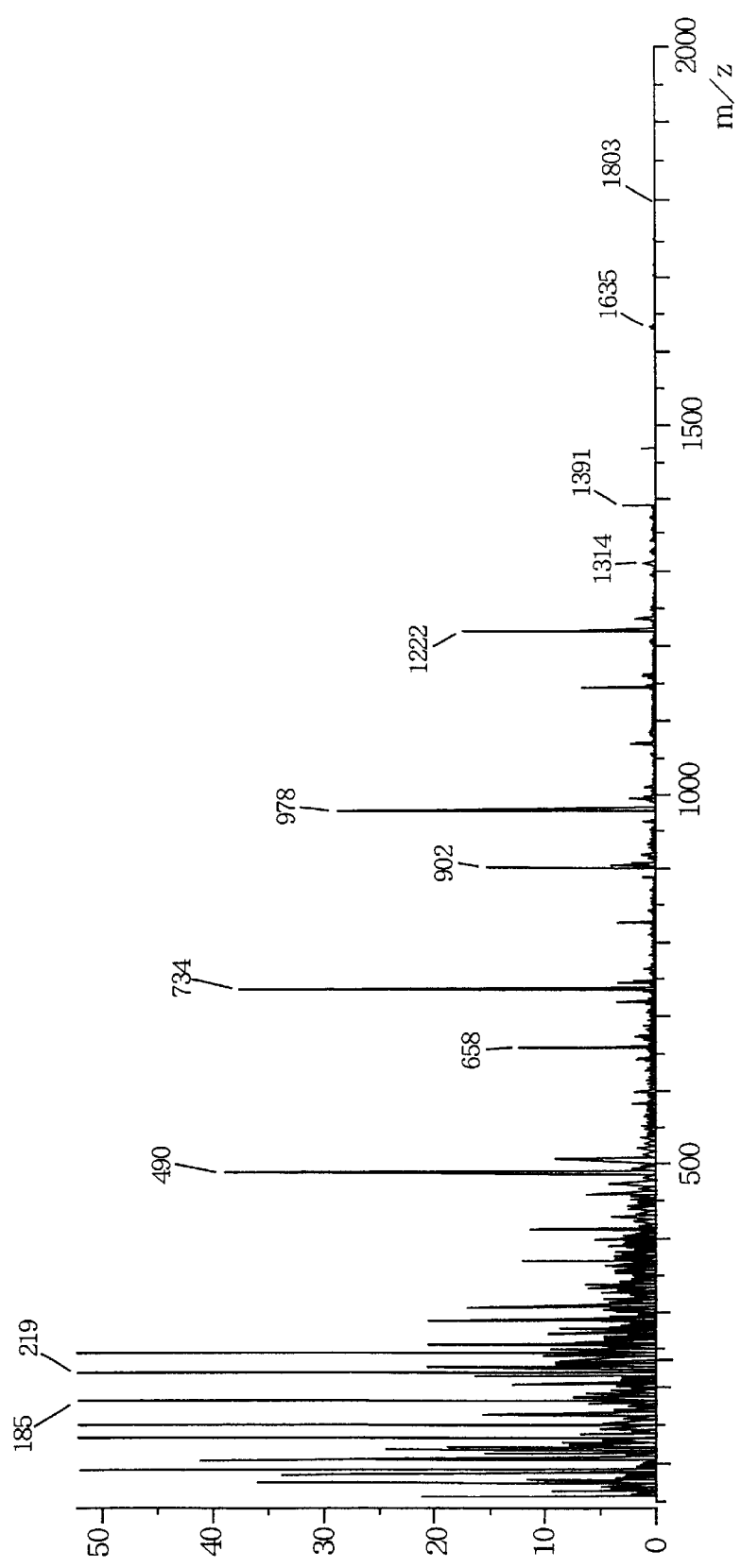
FIG. 1 is a chart showing the FAB-Mass spectrum of the oligomer produced in Reference Example 1.
Figure 2:
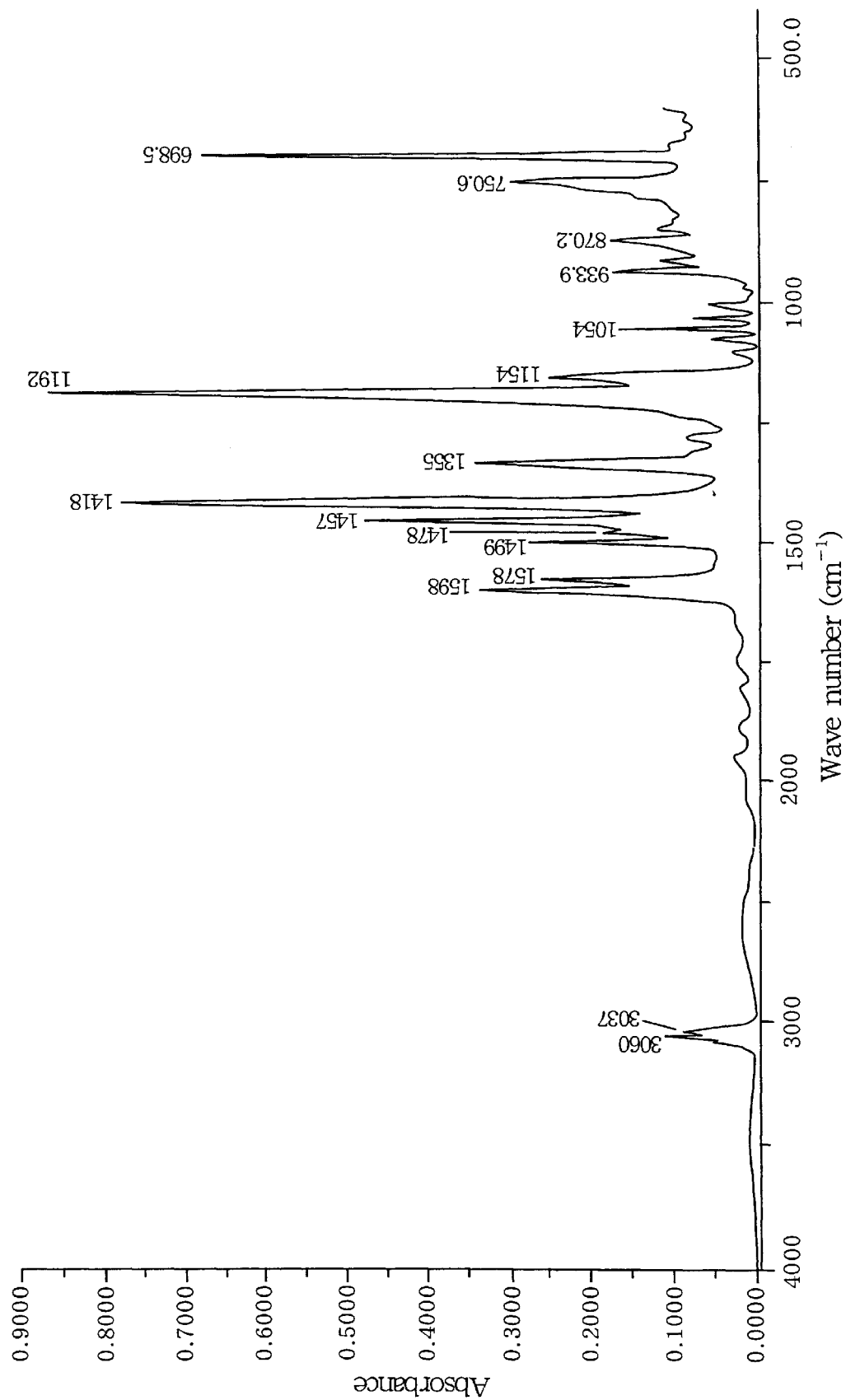
FIG. 2 is a chart showing the infrared absorption spectrum of the aromatic copolymer produced in Example 1.
Figure 3:
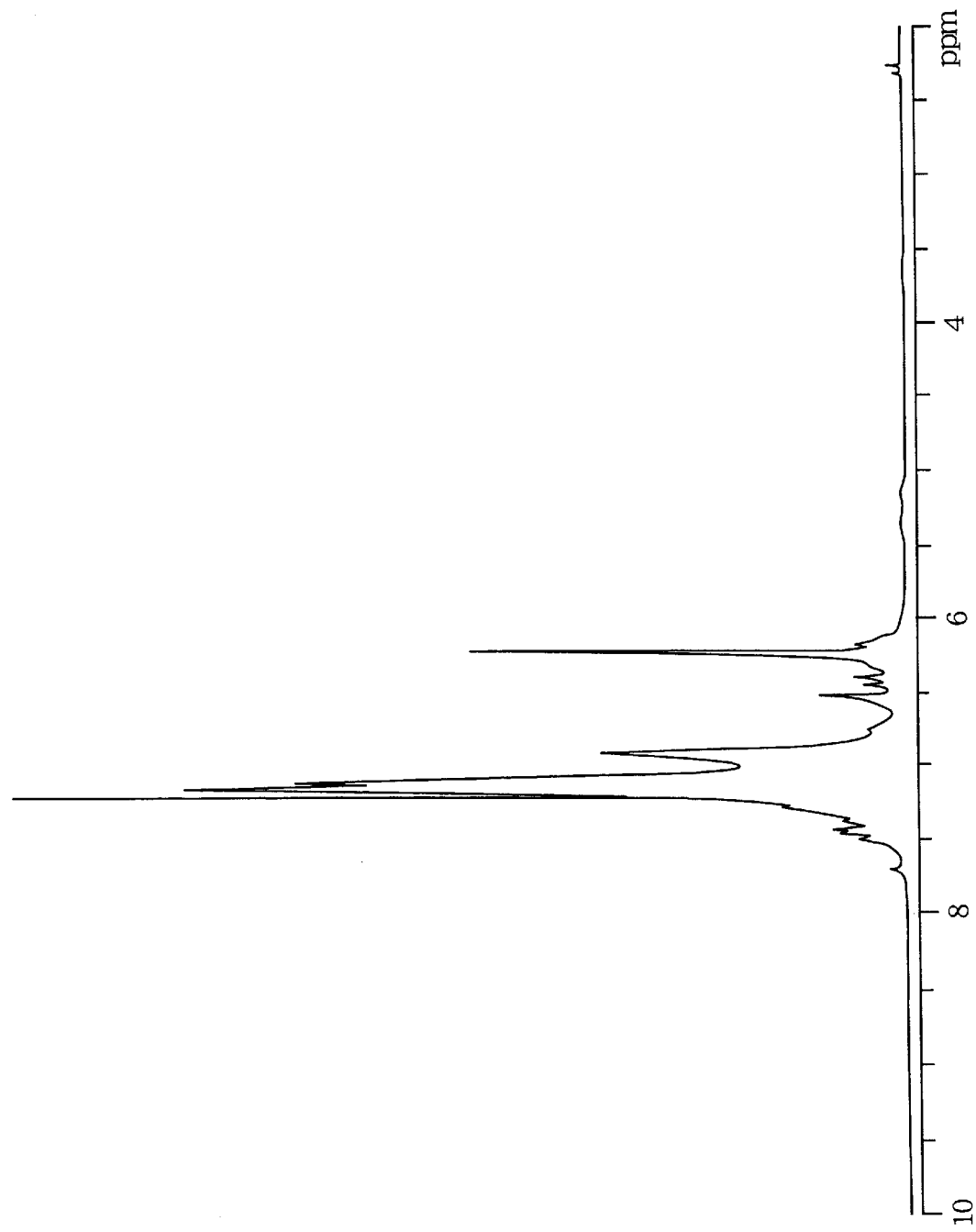
FIG. 3 is a chart showing the $^1$H-NMR spectrum of the aromatic copolymer produced in Example 1.

In one aspect of the present invention, there is provided an aromatic copolymer comprising a plurality of aromatic copolymer chains, each comprising:

(A) recurring 2,6-diphenylphenol units, each represented by the following formula (1):

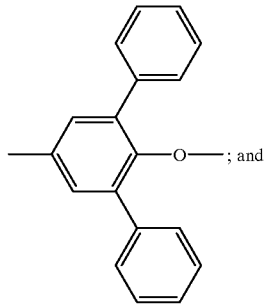

(1)

(B) phenolic comonomer units, each phenolic comonomer unit being independently selected from the group consisting of:
(i) an oxyphenylene monomer unit which is monosubstituted with a substituent selected from the group consisting of a $C_6$–$C_{18}$ monovalent aromatic group and a halogen atom,
(ii) an α-oxynaphthylene monomer unit,
(iii) a β-oxynaphthylene monomer unit, and
(iv) an oxyphenylene monomer unit which is substituted with at least one aliphatic group selected from the group consisting of a $C_1$–$C_{10}$ alkyl group, a $C_1$–$C_{10}$ alkoxy group, a $C_2$–$C_{10}$ alkenyl group and a $C_2$–$C_{10}$ alkynyl group, wherein the amount of the recurring 2,6-diphenylphenol units (A) is from 50 to 98% by weight, based on the weight of the aromatic copolymer, and the amount of the phenolic comonomer units (B) is from 2 to 50% by weight, based on the weight of the aromatic copolymer, provided that, when the oxyphenylene monomer unit (iv) is present as the comonomer unit, the amount of the oxyphenylene monomer unit (iv) is 20% by weight or less, based on the total weight of the phenolic comonomer units (B), and wherein the aromatic copolymer has a weight average molecular weight of from 1,000 to 3,000,000 as measured by gel permeation chromatography.

For easy understanding of the present invention, the essential features and various embodiments of the present invention are enumerated below.

1. An aromatic copolymer comprising a plurality of aromatic copolymer chains, each comprising:

(A) recurring 2,6-diphenylphenol units, each represented by the following formula (1):

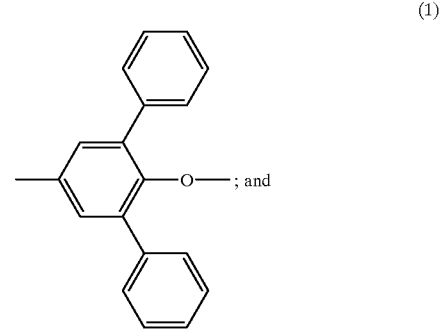

(1)

(B) phenolic comonomer units, each phenolic comonomer unit being independently selected from the group consisting of:
(i) an oxyphenylene monomer unit which is monosubstituted with a substituent selected from the group consisting of a $C_6$–$C_{18}$ monovalent aromatic group and a halogen atom,
(ii) an α-oxynaphthylene monomer unit,
(iii) a β-oxynaphthylene monomer unit, and
(iv) an oxyphenylene monomer unit which is substituted with at least one aliphatic group selected from the group consisting of a $C_1$–$C_{10}$ alkyl group, a $C_1$–$C_{10}$ alkoxy group, a $C_2$–$C_{10}$ alkenyl group and a $C_2$–$C_{10}$ alkynyl group, wherein the amount of the recurring 2,6-diphenylphenol units (A) is from 50 to 98% by weight, based on the weight of the aromatic copolymer, and the amount of the phenolic comonomer units (B) is from 2 to 50% by weight, based on the weight of the aromatic copolymer, provided that, when the oxyphenylene monomer unit (iv) is present as the comonomer unit, the amount of the oxyphenylene monomer unit (iv) is 20% by weight or less, based on the total weight of the phenolic comonomer units (B), and wherein the aromatic copolymer has a weight average molecular weight of from 1,000 to 3,000,000 as measured by gel permeation chromatography.

2. The aromatic copolymer according to item 1 above, wherein each of the phenolic comonomer units (B) is an oxy-2-phenylphenylene monomer unit.
3. The aromatic copolymer according to item 1 or 2 above, which is substantially free of gel.
4. A method for producing an aromatic copolymer of item 1 above, which comprises polymerizing (a) 50 to 98% by weight of 2,6-diphenylphenol with (b) 2 to 50% by weight of at least one phenolic comonomer selected from the group consisting of:
   (i') phenol which is monosubstituted with a substituent selected from the group consisting of a $C_6$–$C_{18}$ monovalent aromatic group and a halogen atom,
   (ii') α-naphthol,
   (iii') β-naphthol, and
   (iv') phenol which is substituted with at least one aliphatic group selected from the group consisting of a $C_1$–$C_{10}$ alkyl group, a $C_1$–$C_{10}$ alkoxy group, a $C_2$–$C_{10}$ alkenyl group and a $C_2$–$C_{10}$ alkynyl group,
   wherein the total amount of the 2,6-diphenylphenol (a) and the at least one phenolic comonomer (b) is 100% by weight and wherein, when the phenol (iv') is used, the amount of the phenol (iv') is 20% by weight or less, based on the weight of the at least one phenolic comonomer (b).
5. The method according to item 4 above, wherein the at least one phenolic comonomer (b) is 2-phenylphenol.
6. The method according to item 4 or 5 above, wherein the polymerization reaction is performed at a temperature of from 30 to 90° C.
7. The method according to any one of items 4 to 6 above, wherein the polymerization reaction is performed in the presence of a catalyst comprising a copper compound and at least one amine.
8. The method according to item 7 above, wherein the catalyst is prepared by mixing the copper compound with the at least one amine, wherein the molar ratio of the copper compound to the at least one amine is from 1/2 to 2/1.
9. A copolymer solution comprising 2 to 70 parts by weight of the aromatic copolymer of any one of items 1 to 3 above dissolved in 30 to 98 parts by weight of a solvent for the aromatic copolymer, wherein the total amount of the aromatic copolymer and the solvent is 100 parts by weight.
10. The copolymer solution according to item 9 above, further comprising a radical initiator.
11. The copolymer solution according to item 10 above, wherein the amount of the radical initiator is from 0.1 to 200% by weight, based on the weight of the aromatic copolymer.
12. The copolymer solution according to item 11 above, wherein the amount of the radical initiator is from 5 to 30% by weight, based on the weight of the aromatic copolymer.
13. The copolymer solution according to any one of items 10 to 12 above, wherein the radical initiator has a half decomposition temperature of 150° C. or higher, wherein the half decomposition temperature is defined as a temperature such that the radical initiator decomposes by 50% by weight thereof when heated in the form of a solution thereof in a solvent inert to the radical initiator at the temperature in an atmosphere of nitrogen gas under atmospheric pressure for 1 minute.
14. The copolymer solution according to item 13 above, wherein the radical initiator has a half decomposition temperature of 200° C. or higher, wherein the half decomposition temperature is as defined above.
15. The copolymer solution according to any one of items 10 to 14 above, wherein the radical initiator is an organic peroxide.
16. The copolymer solution according to any one of items 10 to 14 above, wherein the radical initiator is a bibenzyl compound represented by the following formula (2):

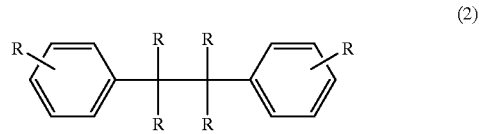

(2)

wherein each R independently represents a hydrogen atom, a $C_1$–$C_{20}$ hydrocarbon group, a cyano group, a nitro group, a $C_1$–$C_{20}$ alkoxy group or a halogen atom.
17. A copolymer film formed from the aromatic copolymer of any one of items 1 to 3 above, which has a thickness of from 0.1 to 500 μm.
18. The copolymer film according to item 17 above, which is produced by a method comprising applying the copolymer solution of any one of items 9 to 16 above to a substrate, and removing the solvent from the copolymer solution.
19. A crosslinked copolymer film obtained by subjecting the copolymer film of item 17 or 18 above to crosslinking treatment.
20. The crosslinked copolymer film according to item 19 above, wherein the crosslinking treatment is heat treatment at a temperature of 300° C. or higher.
21. The crosslinked copolymer film according to item 20 above, wherein the heat treatment is conducted in an atmosphere of an inert gas.
22. The crosslinked copolymer film according to any one of items 19 to 21 above, which does not undergo glass transition at a temperature of 300° C. or less when examined by differential scanning calorimetry (DSC).
23. The crosslinked copolymer film according to item 22 above, which does not undergo glass transition at a temperature of 500° C. or less when examined by differential scanning calorimetry (DSC).
24. The crosslinked copolymer film according to any one of items 19 to 23 above, which contains a non-crosslinked polymer in an amount of 5% by weight or less, based on the weight of the crosslinked copolymer film.
25. The crosslinked copolymer film according item 24 above, which contains a non-crosslinked polymer in an amount of 1% by weight or less, based on the weight of the crosslinked copolymer film.
26. A circuit structure comprising a dielectric layer comprised of the copolymer film of item 17 or 18 above or the crosslinked copolymer film of any one of items 19 to 25 above and a circuit formed on the dielectric layer.
27. A semiconductor device comprising the circuit structure of item 26 above.
28. A circuit board comprising the circuit structure of item 26 above.
29. A semiconductor device comprising a semiconductor and a buffer film comprised of the copolymer film of item 17 or 18 above or the crosslinked copolymer film of any one of items 19 to 25 above.
30. A substrate for a circuit board, comprising a porous substrate and, embedded in the pores of the porous substrate and coated on the porous substrate, the copolymer of any one of items 1 to 3 above or a crosslinked form of the copolymer.

The aromatic copolymer of the present invention comprises a plurality of aromatic copolymer chains, each comprising (A) recurring 2,6-diphenylphenol units each represented by formula (1) above and (B) phenolic comonomer units.

In the present invention, each of phenolic comonomer units (B) is independently selected from the group consisting of:
(i) an oxyphenylene monomer unit which is monosubstituted with a substituent selected from the group consisting of a $C_6$–$C_{18}$ monovalent aromatic group and a halogen atom,
(ii) an α-oxynaphthylene monomer unit,
(iii) a β-oxynaphthylene monomer unit, and
(iv) an oxyphenylene monomer unit which is substituted with at least one aliphatic group selected from the group consisting of a $C_1$–$C_{10}$ alkyl group, a $C_1$–$C_{10}$ alkoxy group, a $C_2$–$C_{10}$ alkenyl group and a $C_2$–$C_{10}$ alkynyl group.

Examples of monosubstituted phenols which can be used for obtaining the above-mentioned oxyphenylene monomer units (i) include 2-phenylphenol, 3-phenylphenol, 4-phenylphenol, naphthylphenol, biphenylphenol, fluorophenol and chlorophenol.

In the present invention, especially preferred oxyphenylene monomer unit (i) is an oxy-2-phenylphenylene monomer unit (derived from 2-phenylphenol).

Examples of phenols substituted with at least one aliphatic group, which can be used for obtaining the above-mentioned oxyphenylene monomer units (iv) include 2,6-dimethylphenol and cresol.

The aromatic copolymer of the present invention does not necessarily comprise oxyphenylene monomer unit (iv). When the aromatic copolymer of the present invention is required to have an especially high heat resistance, it is preferred that the aromatic copolymer of the present invention does not comprise oxyphenylene monomer unit (iv). As mentioned above, when the aromatic copolymer of the present invention comprises oxyphenylene monomer unit (iv), the amount of comonomer unit (iv) is 20% by weight or less, based on the total weight of phenolic comonomer units (B). When the amount of oxyphenylene monomer unit (iv) is more than 20% by weight, the thermal decomposition temperature of the aromatic copolymer is disadvantageously lowered.

In the present invention, it is preferred that each of phenolic comonomer units (B) is an oxy-2-phenylphenylene monomer unit.

With respect to the aromatic copolymer of the present invention, the amount of recurring 2,6-diphenylphenol units (A) is from 50 to 98% by weight, based on the weight of the aromatic copolymer, and the amount of phenolic comonomer units (B) is from 2 to 50% by weight, based on the weight of the aromatic copolymer, provided that, as mentioned above, when oxyphenylene monomer unit (iv) is present as the comonomer unit, the amount of oxyphenylene monomer unit (iv) is 20% by weight or less, based on the total weight of phenolic comonomer units (B).

The amount of recurring 2,6-diphenylphenol units (A) is preferably from 60 to 95% by weight, more preferably from 70 to 90% by weight, based on the weight of the aromatic copolymer. When the amount of recurring 2,6-diphenylphenol units (A) is less than 50% by weight, the heat resistance of the aromatic copolymer is not satisfactory. On the other hand, when the amount of recurring 2,6-diphenylphenol units (A) is more than 98% by weight, the aromatic copolymer is not rendered satisfactorily amorphous.

The aromatic copolymer of the present invention has a weight average molecular weight of from 1,000 to 3,000,000, preferably from 10,000 to 500,000, more preferably from 50,000 to 200,000, as measured by gel permeation chromatography. When the weight average molecular weight of the aromatic copolymer is less than 1,000, the aromatic copolymer has a poor mechanical strength. On the other hand, when the weight average molecular weight of the aromatic copolymer is more than 3,000,000, the aromatic copolymer has a poor moldability.

Hereinbelow, the structure of the aromatic copolymer of the present invention is described.

For example, when the aromatic copolymer of the present invention contains oxy-2-phenylphenylene monomer units as phenolic comonomer units (B), it is conceivable that the oxy-2-phenylphenylene monomer units have any of structures represented by the following formulae (3) to (5):

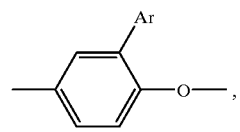

(3)

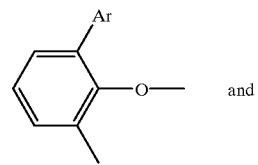

(4)

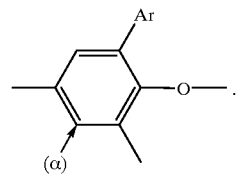

(5)

However, when the aromatic copolymer contains a large amount of oxy-2-phenylphenylene monomer units having a structure represented by formula (5) above, the aromatic copolymer becomes a crosslinked copolymer having a complicatedly branched structure. The aromatic copolymer of the present invention contains almost no monomer unit having a structure represented by formula (5) above, and this is considered to be the reason why the aromatic copolymer of the present invention not only is substantially free of gel but also has the above-mentioned excellent properties. In this connection, a copolymer of 2,6-diphenylphenol with 2-phenylphenol which is produced in Example 1 of the present specification is explained with reference to FIG. 4 showing the $^{13}$C-NMR spectrum of the aromatic copolymer produced in Example 1.

Figure 4:
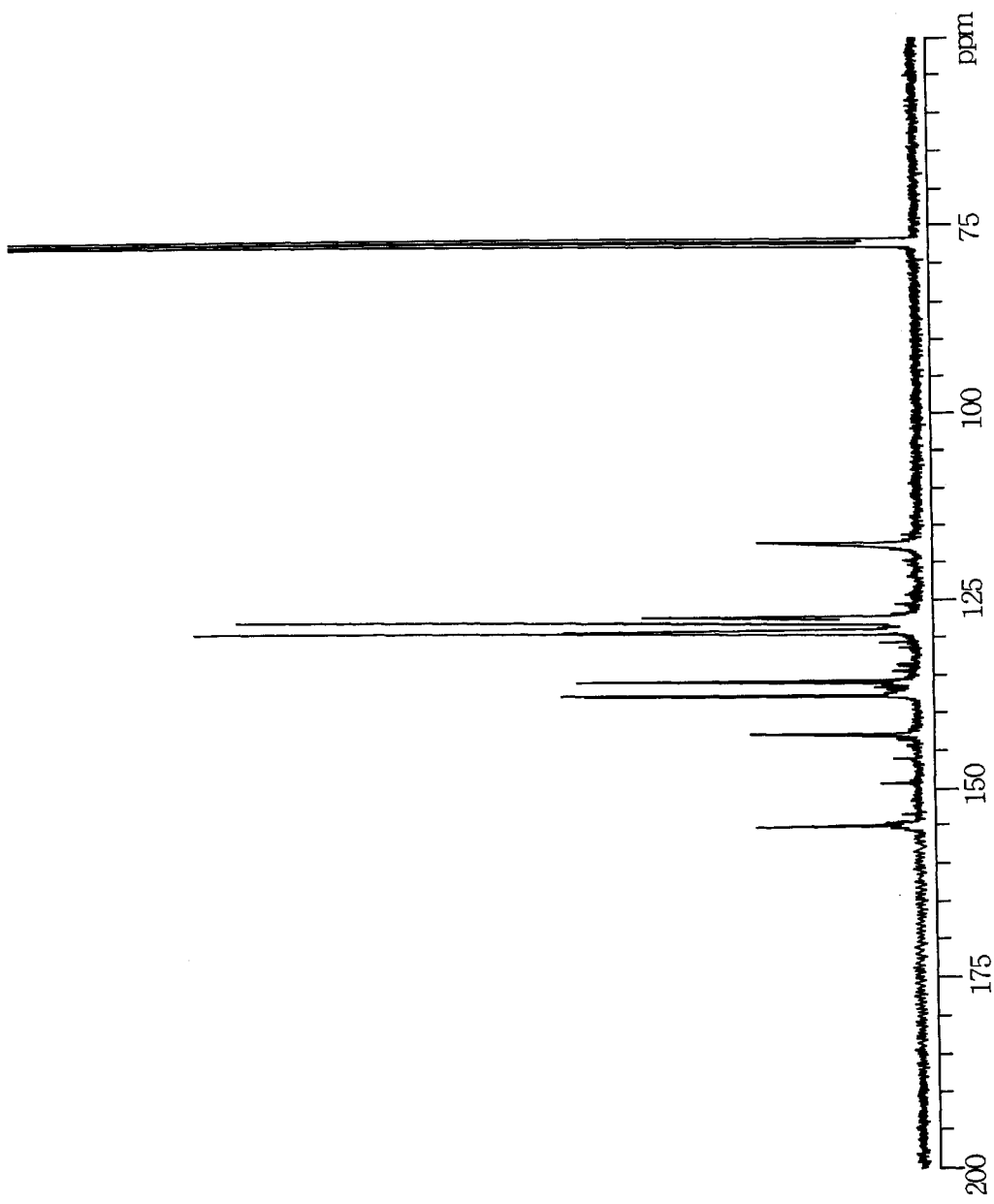
FIG. 4 is a chart showing the $^{13}$C-NMR spectrum of the aromatic copolymer produced in Example 1.

The presence or absence of monomer units having a structure represented by formula (5) above can be confirmed by the presence or absence of a signal appearing at around 108 ppm in $^{13}$C-NMR spectrum in FIG. 4, wherein the signal is ascribed to the carbon atom on the aromatic ring {i.e., the carbon atom indicated by the arrow "α" in formula (5)} between two carbon atoms on the aromatic ring which are, respectively, bonded to the oxygen atoms of the neighboring phenolic monomer units.

In the $^{13}$C-NMR spectrum in FIG. 4, almost no signal is observed around 108 ppm, and, thus, it is confirmed that the aromatic copolymer produced in Example 1 is substantially free of a branched structure occurring due to the presence of the monomer unit having a structure represented by formula (5) above.

In some cases, in the $^{13}$C-NMR spectrum of the aromatic copolymer of the present invention, an extremely small signal may be observed around 108 ppm. However, usually, the aromatic copolymer of the present invention is substantially free of solvent-insoluble gel, even if the aromatic copolymer has a weight average molecular weight of hundreds of thousands. Therefore, the content of the above-mentioned branched structure in the aromatic copolymer of the present invention is extremely small, so that no problem occurs in the practical use of the aromatic copolymer of the present invention.

The aromatic copolymer of the present invention can be produced by a method which comprises polymerizing (a) 50 to 98% by weight of 2,6-diphenylphenol with (b) 2 to 50% by weight of at least one phenolic comonomer, wherein the total amount of 2,6-diphenylphenol (a) and at least one phenolic comonomer (b) is 100% by weight In the present invention, phenolic comonomer (b) is selected from the group consisting of:
  (i') phenol which is monosubstituted with a substituent selected from the group consisting of a $C_6$–$C_{18}$ monovalent aromatic group and a halogen atom,
  (ii') α-naphthol,
  (iii') β-naphthol, and
  (iv') phenol which is substituted with at least one aliphatic group selected from the group consisting of a $C_1$–$C_{10}$ alkyl group, a $C_1$–$C_{10}$ alkoxy group, a $C_2$–$C_{10}$ alkenyl group and a $C_2$–$C_{10}$ alkynyl group, wherein, when phenol (iv') is used, the amount of phenol (iv') is 20% by weight or less, based on the weight of the at least one phenolic comonomer (b).

The amount of 2,6-diphenylphenol (a) is preferably from 60 to 95% by weight, more preferably from 70 to 90% by weight, based on the total weight of 2,6-diphenylphenol (a) and at least one phenolic comonomer (b). When the amount of 2,6-diphenylphenol (a) is less than 50% by weight, the heat resistance of the aromatic copolymer is not satisfactory. On the other hand, when the amount of 2,6-diphenylphenol (a) is more than 98% by weight, the aromatic copolymer is not rendered satisfactorily amorphous.

Examples of comonomers (i') include 2-phenylphenol, 3-phenylphenol, 4-phenylphenol, naphthylphenol, biphenylphenol, fluorophenol and chlorophenol. In the present invention, it is especially preferred that 2-phenylphenol is used as comonomer (i').

Examples of comonomer (iv') include 2,6-dimethylphenol and cresol. In the method of the present invention, it is not necessarily required to use comonomer (iv'). When the aromatic copolymer of the present invention is required to have especially high heat resistance, it is preferred that comonomer (iv') is not used. As mentioned above, in the method of the present invention, when comonomer (iv') is used, the amount of comonomer unit (iv) must be 20% by weight or less, preferably 10% by weight or less, based on the weight of phenolic comonomer (b). When the amount of comonomer (iv') is more than 20% by weight, the thermal decomposition temperature of the aromatic copolymer is disadvantageously lowered.

In the present invention, it is preferred that at least one phenolic comonomer (b) is 2-phenylphenol or α-naphthol.

Further, in the present invention, various phenolic comonomers (b) can be used individually or in combination.

In general, a polymerization reaction of unsubstituted phenol or a monosubstituted phenol such as comonomer (i') mentioned above does not proceed smoothly but results in a crosslinked copolymer having a complicatedly branched structure, differing from a polymerization of 2,6-disubstituted phenol. This is due to the fact that, with respect to the unsubstituted phenol or the monosubstituted phenol, an oxidative coupling polymerization reaction occurs not only at the paraposition of the phenol but also at the ortho-position of the phenol. For example, Recl. Trav. Chim. Pays-Bas 109, 97–102 (1990) describes that, for advancing the polymerization of a phenolic compound, it is necessary for the phenolic compound to have substituents at the two ortho-positions thereof, and when the unsubstituted phenol or monosubstituted phenol is subjected to a polymerization reaction, a crosslinked copolymer having a complicatedly branched structure is inevitably obtained.

In Die Makromolekulare Chemie, 176, 1349–1358 (1975), Tsuchida et al. describe that an experiment for polymerizing a monosubstituted phenol was conducted and a polymer soluble in a solvent was obtained. However, the molecular weight of the obtained polymer was very low.

On the other hand, the present inventors have found for the first time that when 2,6-diphenylphenol is copolymerized with at least one specific phenolic comonomer, such as comonomer (i') which is a specific monosubstituted phenol, wherein 2,6-diphenylphenol and the phenolic comonomer are used in a specific ratio, a high-molecular weight aromatic copolymer which is substantially free of gel can be obtained.

In the present invention, with respect to the polymerization conditions, the same conditions as used for the well-known oxidative coupling polymerization of a disubstituted phenol can be employed as basic conditions for the copolymerization reaction. For example, the methods of polymerizing 2,6-dimethylphenol are described in Polymer, 31, 1361 (1990), Recl. Trav. Chim. Pays-Bas 108, 247 (1989), J. Polym. Sci. Part A, 30, 901 (1992), Recl. Trav. Chim. Pays-Bas 109, 97–102 (1990), Recl. Trav. Chim. Pays-Bas 108, 167–171 (1989) and the like. Further, the methods of polymerizing 2,6-diphenylphenol are described in J. Polym. Sci. Part A-1, 8, 1427 (1970), Macromolecules, 3, 5, 533 (1970), Macromolecules, 4, 5, 642 (1971) and the like.

A typical polymerization method is a method comprising dissolving 2,6-diphenylphenol (a), at least one phenolic comonomer (b) and a catalyst in an appropriate solvent to thereby form a reaction system, and introducing air or oxygen gas into the reaction system to effect a copolymerization reaction.

Examples of catalysts which can be preferably used in the present invention include a catalyst comprising a copper compound and at least one amine, but there is no particular limitation with respect to the catalyst. For example, a nickel compound or a manganese compound can be used in place of the above-mentioned copper compound.

Examples of copper compounds include cuprous chloride, cupric chloride, cuprous bromide, cupric bromide, cuprous sulfate, cupric sulfate, cuprous nitrate, cupric nitrate, cuprous acetate, cupric acetate, cuprous azide, cupric azide, cuprous toluate and cupric toluate. Among these copper compounds, cuprous chloride, cupric chloride, cuprous bromide and cupric bromide are preferred. When the copper compound is used for preparing a catalyst, there is no particular limitation with respect to the amount of the copper compound. Usually, however, the amount of the copper compound is from about 0.01 to 25% by weight, based on the total weight of 2,6-diphenylphenol (a) and phenolic comonomer (b).

In the present invention, the amine used for preparing a catalyst is preferably at least one amine selected from the group consisting of tertiary amines and secondary amines. The tertiary amines and secondary amines can be used individually or in combination.

Examples of tertiary amines include monoamines, such as trimethylamine, triethylamine, tripropylamine, tributylamine, butyldimethylamine and phenyldiethylamine; N,N,N',N'-tetramethylethylenediamine, N,N,N',N'-tetramethyl-1,3-diaminopropane, N,N,N',N'-tetramethyl-1,3-diaminobutane, N,N,N',N'-tetramethyl-1,3-diamino-2-methylpropane, N,N,N',N'-tetramethyl-1,4-diaminobutane, N,N,N',N'-tetramethyl-1,4-diaminopentane and the like.

Examples of secondary amines include aliphatic secondary monoamines, such as dimethylamine, di-n-propylamine, di-n-butylamine, di-sec-butylamine, di-tert-butylamine, dipentylamine, dihexylamine, dioctylamine, didecylamine, dibenzylamine, methylethylamine, methylbutylamine and dicyclohexylamine; aliphatic diamines having a secondary amine moiety, such as N-methyl-1,3-diaminopropane, N,N'-dimethyl-1,3-diaminopropane, N,N,N'-trimethyl-1,3-diaminopropane, N-ethyl-1,3-diaminopropane, N-methyl-1,3-diaminobutane, N,N'-dimethyl-1,3-diaminobutane, N,N,N'-trimethyl-1,3-diaminobutane and N-ethyl-1,3-diaminobutane; N-phenylethanolamines, such as N-phenylethanolamine, N-(m-methyl)phenylethanolamine, N-(p-methyl)phenylethanolamine, N-(2,6-dimethyl) phenylethanolamine and N-(p-chloro)phenylethanolamine; and N-substituted anilines each having a hydrocarbon group at the amino group thereof, such as N-ethylaniline, N-butylaniline, N-methyl-2-methylaniline, N-methyl-2,6-dimethylaniline and diphenylamine.

With respect to the ratio of the copper compound to at least one amine, it is preferred that the molar ratio of the copper compound to the amine is from 1/20 to 10/1, preferably from 1/2 to 2/1.

There is no particular limitation with respect to the solvent used for the polymerization. Examples of solvents which can be used for the polymerization include aromatic hydrocarbons, such as benzene, toluene, xylene, mesitylene and ethylbenzene; halogenated hydrocarbons, such as chloroform, methylene chloride, 1,2-dichloroethane, trichloroethane, chlorobenzene, dichlorobenzene and trichlorobenzene; nitro compounds, such as nitrobenzene; alcohols, such as methanol, ethanol, propanol, butanol, benzyl alcohol and cyclohexanol; aliphatic hydrocarbons, such as pentane, hexane, heptane, cyclohexane and cycloheptane; ketones, such as acetone, methylethylketone, cyclohexanone and cyclopentanone; esters, such as ethyl acetate and ethyl formate; ethers, such as tetrahydrofuran and diethylether; amides, such as dimethyl formamide; sulfoxides, such as dimethyl sulfoxide, and the like. Among these solvents, benzene, toluene, xylene, mesitylene, tetrahydrofuran, cyclohexanone and cyclopentanone are especially preferred.

The ratio of the sum of 2,6-diphenylphenol (a) and phenolic comonomer (b) to the solvent is preferably such that the total concentration of 2,6-diphenylphenol (a) and phenolic comonomer (b) is from 1 to 40% by weight, based on the weight of the solution of 2,6-diphenylphenol (a) and phenolic comonomer (b) in the solvent. When a mixture of a good solvent and a poor solvent for an aromatic copolymer obtained by the oxidative coupling polymerization (copolymerization) of 2,6-diphenylphenol (a) with phenolic comonomer (b) is used for the copolymerization, by appropriately choosing the ratio of the amount of the good solvent to the amount of the poor solvent, the copolymerization can be conducted by either solution polymerization or precipitation polymerization (in the precipitation polymerization, as the copolymerization proceeds, the resultant aromatic copolymer is precipitated as particles in the reaction solvent).

When the above-mentioned copolymerization is conducted, it is preferred that the above-mentioned copolymerization is conducted in the presence of a dehydrating agent in order to inhibit undesirable side reactions occurring due to the by-produced water. There is no particular limitation with respect to the dehydrating agent as long as the dehydrating agent has a dehydrating effect. Examples of dehydrating agents include molecular sieves; neutral salts, such as magnesium sulfate, calcium sulfate, sodium sulfate and calcium chloride; and zeolites. The amount of the dehydrating agent is appropriately selected taking into consideration the amount of water which may be by-produced in the polymerization reaction system.

In the present invention, it is preferred that the temperature for the above-mentioned copolymerization is in the range of from 30 to 100° C., preferably from 40 to 90° C. When the above-mentioned copolymerization is conducted at a temperature within the above temperature range, an aromatic copolymer which is substantially free of gel can be effectively obtained. When the copolymerization is conducted at a temperature of lower than 30° C., the polymerization rate is disadvantageously lowered. On the other hand, when the copolymerization is conducted at a temperature of higher than 100° C., the resultant aromatic copolymer contains a large amount of undesirable solvent-insoluble gel. However, even if a small amount of gel is produced in the course of the production of the aromatic copolymer, the gel can be removed by an appropriate method, such as filtration or centrifugation, to obtain the aromatic copolymer of the present invention.

When oxygen is introduced into the reaction system under the above-mentioned conditions, the copolymerization proceeds. The oxygen includes not only pure oxygen gas but also an oxygen-containing gas, such as air and a gas mixture of oxygen gas and an inert gas (such as nitrogen), wherein the ratio of oxygen gas contained in the gas mixture can be appropriately chosen. There is no particular limitation with respect to the content of oxygen gas in the oxygen-containing gas. When the content of oxygen gas is increased, the polymerization rate is also increased. Therefore, from the viewpoint of the productivity of the aromatic copolymer or the like, it is preferred that the content of oxygen gas is 20% by volume or more. The above-mentioned copolymerization can be conducted under ambient pressure. However, if desired, the above-mentioned copolymerization can be conducted under superatmospheric pressure or under reduced pressure. The time required for the above-mentioned copolymerization drastically changes depending on the desired molecular weight of the aromatic copolymer or the reaction conditions. But, the time for the copolymerization is generally from several minutes to several tens of hours.

Further, differing from the above-mentioned copolymerization method, a copolymerization method using silver oxide as an oxidizing agent, or a copolymerization method in which the oxidative coupling polymerization is electrochemically conducted can be used for producing the aromatic copolymer of the present invention [see MACROMOL. SCI-CHEM., A21(8 & 9), 1081 (1984)]. When a copolymerization method using silver oxide as an oxidizing agent is employed, 2,6-di-phenylphenol (a) and at least one phenolic comonomer (b) are dissolved in an appropriate solvent to thereby obtain a solution. Then, silver oxide is added to the obtained solution and the resultant mixture is heated to effect a copolymerization reaction. With respect to this copolymerization method, no catalyst (such as a catalyst comprising a copper compound and at least one amine) is required.

The aromatic copolymer of the present invention can be obtained in the form of a block copolymer by the following method. 2,6-Diphenylphenol (a) or at least one phenolic comonomer (b) is homopolymerized to thereby obtain a solution containing a homopolymer. Then, a monomer selected from the group consisting of 2,6-diphenylphenol (a) or at least one phenolic comonomer (b), which monomer is not used for producing the above-mentioned homopolymer, is added to the above-mentioned solution so as to effect a copolymerization reaction and obtain a block copolymer.

The aromatic copolymer obtained by the above-mentioned method is purified and collected by a conventional method, such as filtration, washing with water, a solvent or an acid, reprecipitation or the like.

If desired, the aromatic copolymer is dissolved in an appropriate solvent to thereby obtain a solution and the obtained solution is brought into contact with an ion exchange resin to remove ionic impurities contaminating in the solution. The type of the ion exchange resin changes depending on the type of the ionic impurities to be removed. Examples of ion exchange resins include strongly acidic cation exchange resins having sulfonic acid groups as cation exchange groups; weakly acidic cation exchange resins having carboxylic acid groups as cation exchange groups; strongly basic anion exchange resins having quaternary ammonium groups as anion exchange groups; and weakly basic anion exchange resins having primary, secondary or tertiary ammonium groups as anion exchange groups. Examples of methods for bringing the solution of the aromatic copolymer into contact with an ion exchange resin include:

a method in which a solution of the aromatic copolymer is simply brought into contact with an ion exchange resin to remove ionic impurities; and a method in which a solution of the aromatic copolymer is passed through a column packed with an ion exchange resin to remove ionic impurities contaminating in the solution.

The aromatic copolymer of the present invention can be molded by various molding methods which are applied to conventional polymers. That is, the aromatic copolymer of the present invention can be subjected to injection molding, extrusion molding or the like to obtain a structural part, a film or the like. Further, a copolymer solution comprising the aromatic copolymer of the present invention, which is obtained by dissolving the aromatic copolymer of the present invention in an appropriate solvent, can be subjected to a conventional method for producing a film, such as casting, spin coating or the like to obtain a copolymer film which has a which has a thickness of from 0.1 to 500 $\mu$m, and the obtained film can be advantageously used as an insulator film for electric or electronic parts. Furthermore, a prepreg obtained by impregnating an appropriate porous substrate, such as a glass cloth or a nonwoven fabric, with the above-mentioned copolymer solution can be cured by heating to thereby obtain a plate, and the obtained plate can be used as a substrate for a circuit board.

Hereinbelow, an explanation is made with respect to the above-mentioned copolymer solution comprising the aromatic copolymer of the present invention.

There is no particular limitation with respect to the solvent used for preparing a copolymer solution, as long as the aromatic copolymer can be dissolved in the solvent. Examples of such solvents include aromatic hydrocarbons, such as toluene, xylene, mesitylene, durene and tetralin; halogenated hydrocarbons, such as chloroform, dichloromethane, dichloroethane, trichloroethane, tetrachloroethane, chlorobenzene and dichlorobenzene; ketones, such as cyclohexanone, cyclopentanone and acetophenone; esters, such as ethyl lactate; ethers, such as tetrahydrofuran, dioxane and anisole; N-methylpyrrolidone, tetramethylurea, propylene glycol 1-monomethylether-2-acetate, 1-methoxy-2-propanol and the like. Among these solvents, in view of the workability, safety, economy, film-forming properties and the like of the copolymer solution, toluene, xylene, mesitylene, cyclopentanone, anisole, N-methylpyrrolidone, ethyl lactate and propylene glycol-1-monomethylether-2-acetate are preferred. These solvents can be used individually, but in order to improve the film-forming properties, wettability against the substrate, workability or the like of the copolymer solution, several solvents can be used in combination.

The appropriate concentration of the copolymer solution changes depending on the use of the solution, the molecular weight of the aromatic copolymer and the like. However, it is generally preferred that the concentration of the copolymer solution is 2 to 70% by weight, more preferably 5 to 30% by weight, based on the weight of the copolymer solution.

When a film is formed from the obtained copolymer solution by the above-mentioned method, followed by evaporation-off of the solvent contained in the copolymer solution, a copolymer film can be obtained. The obtained copolymer film as such not only is excellent in the heat resistance and water resistance but also exhibits excellent electrical properties, such as low dielectric constant, low dielectric loss and high breakdown voltage, so that the copolymer film has various uses. However, a crosslinked copolymer film, obtained by subjecting the copolymer film to crosslinking treatment, has improved heat resistance and improved solvent resistance, as compared to those of the copolymer film (prior to crosslinking treatment) and exhibits more excellent physical properties. The crosslinking can be conducted by a conventional method, such as heat treatment, light irradiation, electron beam irradiation and the like. However, in many cases, the process for producing electronic or electric parts includes a heat treatment step. Therefore, it is most convenient and preferable to conduct the crosslinking treatment by heat treatment in the course of the production of electronic or electric parts using the copolymer film of the present invention. The crosslinking of the copolymer film of the present invention proceeds simply by heating at an appropriate temperature. However, the crosslinked copolymer film having a high crosslinking density can be effectively obtained by using a solution prepared by adding a radical initiator to the above-mentioned copolymer solution.

In the present invention, generally known radical initiators can be used. Examples of radical initiators include peroxides, such as benzoyl peroxide, dicumyl peroxide, t-butylperoxyisobutylate, di-t-butylperoxy-2-methylcyclohexane, 1,1-bis(t-butylperoxy)-3,3,5-trimethylcyclohexane, 1,1-bis(t-butylperoxy)cyclohexane, 2,2-bis(4,4-di-t-butylperoxycyclohexyl)propane, 1,1-bis(t-butylperoxy)cyclododecane, t-hexylperoxyisopropylmonocarbonate, t-butylperoxymaleate, t-butylperoxy-3,3,5-trimethylhexanoate, t-butylperoxylaurate, 2,5-dimethyl-2,5-di(m-toluoylperoxy)hexane, t-butylperoxyisopropylmonocarbonate, t-butylperoxy-2- ethylhexylmonocarbonate, t-hexylperoxybenzoate, 2,5-dimethyl-2,5-di(benzoylperoxy)hexane, t-butylperoxyacetate, 2,2-bis(t-butylperoxy)butane, t-butylperoxybenzoate, n-butyl-4,4-bis(t-butylperoxy) valerate, di-t-butylperoxy-isophthalate, α, α-bis(t-butylperoxy)diisopropylben-zene, 2,5-dimethyl-2,5-di(t-butylperoxy)hexane, t-butylhydroperoxide, p-menthanehydroperoxide, 2,5-di-methyl-2,5-di(t-butylperoxy)-3-hexyne, diisopropylbenzenehydroperoxide, t-butyltrimethylsilylperoxide, 1,1,3,3-tetramethylbutylhydroperoxide, cumylhydroperoxide, t-hexylhydroperoxide, t-butylhydroperoxide, t-butylcumylperoxide, p-cymenehydroperoxide, diacetylperoxide, diisobutyrylperoxide, dioctanoylperoxide, didecanoylperoxide, dilauroylperoxide, m-toluoylperoxide, t-butylperoxylaurate and 1,3-bis(t-butylperoxyisopropyl) benzene.

Further, a bibenzyl compound represented by the following formula (2):

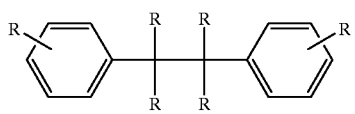

(2)

wherein each R independently represents a hydrogen atom, a $C_1$–$C_{20}$ hydrocarbon group, a cyano group, a nitro group, a $C_1$–$C_{20}$ alkoxy group or a halogen atom, can also be preferably used as a radical initiator.

Examples of bibenzyl compounds which are represented by formula (2) above include 2,3-dimethyl-2,3-diphenylbutane, α,α'-dimethoxy-α,α'-diphenylbibenzyl, α,α'-diphenyl-α-methoxybibenzyl, α,α'-dimethoxy-α,α'-dimethylbibenzyl, α,α'-dimethoxybibenzyl, 3,4-dimethyl-3,4-diphenyl-n-hexane, 2,2,3,3-tetraphenylsuccinonitrile and dibenzyl.

In the present invention, it is preferred to use a radical initiator having a high half decomposition temperature. The "half decomposition temperature" is defined as a temperature at which the radical initiator decomposes by 50% by weight thereof when heated in the form of a solution thereof in a solvent inert to the radical initiator in an atmosphere of nitrogen gas under atmospheric pressure for 1 minute.

The method for determining the half decomposition temperature of the radical initiator changes depending on the type of the radical initiator. Example of a specific method for determining the half decomposition temperature of the radical initiator is as follows. A radical initiator is dissolved in a solvent inert to the radical initiator to thereby obtain a solution having an appropriate concentration. Then, the obtained solution is heated in a sealed tube in an atmosphere of nitrogen gas under atmospheric pressure for 1 minute to effect a decomposition reaction of the radical initiator. Immediately after 1 minute from the start of the reaction, the solution is cooled to terminate the reaction, thereby obtaining a reaction mixture, and the concentration of the radical initiator remaining in the reaction mixture is determined. The above operation is repeated by varying a temperature for the decomposition reaction, so as to determine the temperature at which the concentration of the radical initiator remaining in the reaction mixture becomes 50%, based on the concentration of the radical initiator prior to the decomposition reaction. The determined temperature is a half decomposition temperature.

In the present invention, it is preferred to use a radical initiator having a half decomposition temperature of 150° C. or higher, more preferably 200° C. or higher.

When the half decomposition temperature of the radical initiator is too low, the pot life of the copolymer solution becomes short and, in addition, the radical initiator rapidly decomposes during the evaporation of the solvent of the copolymer solution, so that the crosslinking does not effectively proceed and the quality of the resultant crosslinked copolymer film is disadvantageously lowered. The reason why the use of a radical initiator having a low half decomposition temperature gives a copolymer film having poor properties is unclear. However, it should be noted that the copolymer film of the present invention exhibits a high glass transition temperature, i.e., a glass transition temperature of 200° C. or more. Therefore, when a radical initiator having a low half decomposition temperature is used, radicals are generated at a low temperature at which the aromatic copolymer chains of the aromatic copolymer exhibit low mobility, so that the radicals may be inactivated without exhibiting the activity for a crosslinking of the aromatic copolymer.

It is preferred that the amount of the radical initiator is from 0.1 to 200% by weight, more preferably from 1 to 50% by weight, most preferably from 5 to 30% by weight, based on the weight of the aromatic copolymer. When the amount of the radical initiator is too small, the effect of the addition of the radical initiator is not satisfactory. On the other hand, when the amount of the radical initiator is too large, the properties of the crosslinked copolymer film is adversely effected.

With respect to the method for adding the radical initiator to the copolymer solution, from the viewpoint of ease of addition, it is most preferred to dissolve the radical initiator into the solvent together with the copolymer when the copolymer solution is prepared. When the radical initiator is added to the copolymer solution, an additive, such as an agent for improving an adheraility and a leveling agent, can be added to the copolymer solution for improving the workability of the solution or improving the characteristics of the film obtained from the solution.

Generally, the inclusion of any particles into a material for electric or electronic parts should be avoided to the utmost. Therefore, it is preferred that before use for producing a copolymer film, the copolymer solution or the solution of the copolymer and the radical initiator is filtered by means of a filter having a pore size of from 0.1 to 1 μm.

In general, an interlayer dielectric film for an LSI multilevel interconnect, an LSI passivation film or the like is produced from the copolymer solution of the present invention by spin coating. When the substrate is subjected to spin coating for producing an interlayer dielectric film or an LSI passivation film, the substrate is frequently subjected to surface treatment before the spin coating. Usually, one time spin coating provides a film having a thickness of from 0.1 to 10 μm. If desired, a film having a thickness of more than 10 μm can be obtained by spin coating using a copolymer solution having a high concentration of the copolymer or by the repeated spin coatings.

The temperature for drying the film obtained by the above-mentioned method changes depending on the type of the solvent used as the solvent for preparing the copolymer solution. In general, the film is dried at a temperature in the range of from room temperature to 200° C. When the solvent is evaporated off too rapidly, the smoothness of the surface of the film is deteriorated. It is preferred that in order to control the evaporation rate of the solvent, the solvent is evaporated off by two-step heating. For example, when the solvent is toluene, the film can be dried by the following method. That is, the film is subjected to predrying at 40 to 80° C. (which is lower than the boiling point of toluene), followed by drying at about 180° C. (which is higher than the boiling point of toluene) so that toluene is completely evaporated off.

When the copolymer film obtained by the above-mentioned method is intended to be crosslinked, the copolymer film is subjected to crosslinking treatment, such as heat treatment. When the crosslinking is conducted by heat treatment, the heat treatment is generally conducted at a temperature of 200° C. or higher, preferably 300° C. or higher, more preferably 350° C. or higher. When the heat treatment for crosslinking is conducted at a temperature of lower than 200° C., the crosslinking reaction does substantially not proceed, even if the copolymer solution used for producing the copolymer film contains a radical initiator. For example, the heat treatment for crosslinking is conducted at a temperature of from 350 to 450° C. for 20 minutes to 1 hour in an atmosphere of nitrogen gas. When the heat treatment is conducted in the presence of oxygen gas (for example, in an atmosphere of air), the crosslinking reaction rate becomes high. However, when the crosslinked copolymer film of the present invention is intended to be used as a buffer film for a semiconductor device or a dielectric layer for a circuit structure of a semiconductor device, which comprises aluminum as a material for circuit, the heat treatment in the presence of oxygen gas is problematic because the aluminum as a material for circuit is disadvantageously oxidized during the heat treatment in the presence of oxygen gas. When the heat treatment in the presence of oxygen gas is not preferred as in the above-mentioned case, the crosslinking can be conducted by heat treatment in an atmosphere of an inert gas, such as nitrogen gas, helium and argon. Even in this case, the crosslinking reaction rate is practically satisfactory.

The reason why the crosslinking reaction of the aromatic copolymer (which has no highly reactive group) of the present invention occurs has not been elucidated.

The heat resistance and solvent resistance of the crosslinked copolymer film are remarkably improved, as compared to those of the copolymer film (prior to crosslinking). The copolymer (prior to crosslinking) undergoes glass transition at about 200° C., which is observed by differential scanning calorimetry (hereinafter, simply referred to as "DSC"). However, once the copolymer is crosslinked, glass transition is not observed by DSC at a temperature of 300° C. or lower. When the crosslinking further proceeds, glass transition is not observed by DSC at a temperature of 500° C. or lower.

The copolymer (prior to crosslinking) can be dissolved in a generally used organic solvent. On the other hand, the crosslinked copolymer which is satisfactorily crosslinked is almost not dissolved in or swelled with any solvents. With respect to the crosslinked copolymer film of the present invention, it is preferred that the content of a non-crosslinked copolymer (which is soluble in a solvent, such as N-methylpyrrolidone) is 5% by weight or less, more preferably 1% by weight or less, based on the weight of the crosslinked copolymer film.

If desired, patterning of the above-mentioned copolymer film and crosslinked copolymer film can be easily conducted by means of a conventional resist.

When the molecular weight of the aromatic copolymer and/or the concentration of the aromatic copolymer in the copolymer solution is appropriately controlled, the aromatic copolymer of the present invention can be well impregnated into a porous substrate, and can be completely embedded in a minute curcuit pattern. Further, the aromatic copolymer of the present invention has an excellent adhesion to materials for circuit (such as aluminum and copper), ceramic materials (such as glass and silica) and the like. For this reason, the aromatic copolymer of the present invention and a solution thereof can be advantageously used as a material for a printed circuit board or a substrate for BGA, MCM and the like.

The aromatic copolymer of the present invention or the copolymer film formed from a solution of the aromatic copolymer has an excellent heat resistance, excellent electrical characteristics (such as a low dielectric constant) and an excellent water resistance. Further, the crosslinked copolymer film obtained by subjecting the copolymer film to crosslinking treatment exhibits not only a more excellent heat resistance but also an excellent solvent resistance. Therefore, the above-mentioned copolymer film and crosslinked copolymer film can be advantageously used for the following objects.

(1) a circuit structure comprising a dielectric layer comprised of the copolymer film or the crosslinked copolymer film and a circuit formed on the dielectric layer;
(2) a semiconductor device comprising circuit structure (1);
(3) a circuit board comprising circuit structure (1); and
(4) a semiconductor device comprising a semiconductor and a buffer film comprised of the copolymer film or the crosslinked copolymer film.

With respect to a specific example of the circuit structure described in items (1) and (3), there can be mentioned a printed circuit board. With respect to a specific example of the semiconductor device described in items (2) and (4), there can be mentioned an LSI. (For example, the above-mentioned copolymer film and crosslinked copolymer film can be advantageously used as an interlayer dielectric film for an LSI multilevel interconnect, an LSI passivation film and the like).

BEST MODE FOR CARRYING OUT THE INVENTION

Hereinbelow, the present invention will be described in more detail with reference to the following Examples, Reference Example and Comparative Examples, which should, however, not be construed as limiting the scope of the present invention.

In the following Examples, Reference Example and Comparative Examples, various properties were measured by the following methods.

The weight average molecular weight of the copolymer (or polymer) in terms of the weight average molecular weight of polystyrene was measured by gel permeation chromatography (GPC) under the following conditions. Column: TSKGel-G5000H (manufactured and sold by Tosoh Corp., Japan), GPC K-801 (manufactured and sold by Showa Denko K.K., Japan) and GPC K-803 (manufactured and sold by Showa Denko K.K., Japan), which are connected in series Developing solvent: chloroform (flow rate: 1 ml/min.) Apparatus: a GPC apparatus manufactured and sold by Japan Spectrometric Co., Ltd., Japan Differential scanning calorimetry (DSC) was conducted by means of a differential scanning calorimeter DSC 7 (manufactured and sold by Perkin Elmer Cetus Co., U.S.A.) at a rate of temperature elevation of 10° C./min in an atmosphere of nitrogen gas.

The heat resistance of the copolymer film (or crosslinked copolymer film) was evaluated using the loss in weight of the copolymer film (or crosslinked copolymer film) after isothermal heating and the temperature for a 5% loss in weight of the copolymer film (or crosslinked copolymer film) by heating, each of which was measured by means of a thermobalance THERMO-FLEX Tas-300 TG8110D (manufactured and sold by Rigaku Corporation, Japan) in an atmosphere of helium gas.

The loss in weight of the copolymer film (or crosslinked copolymer film) after isothermal heating was evaluated as follows. The copolymer film (or crosslinked copolymer film) was heated to 400° C. at a rate of temperature elevation of 50° C./min, and maintained at 400° C. for 2 hours. The loss in weight of the copolymer film (or crosslinked copolymer film) after isothermal heating was evaluated by determining the loss in weight of the copolymer film (or crosslinked copolymer film) after the heating, as compared to the weight of the copolymer film (or crosslinked copolymer film) prior to heating.

The temperature for a 5% loss in weight of the copolymer film (or crosslinked copolymer film) by heating was evaluated as follows. The copolymer film (or crosslinked copolymer film) was heated to 400° C. at a rate of temperature elevation of 50° C./min, kept at 400° C. for 1 hour, and reheated to 900° C. at a rate of temperature elevation of 10° C./min. The temperature for a 5% loss in weight of the copolymer film (or crosslinked copolymer film) by heating was evaluated by observing the loss in weight of the copolymer film (or crosslinked copolymer film) during the above reheating.

The dielectric constant of the copolymer film (or crosslinked copolymer film) was measured by means of a 1 MHz dielectric constant measuring apparatus C-V plotter HP4280A (manufactured and sold by Yokogawa-Hewlett-Packard, Ltd., Japan) by sealed microprobe method.

The thickness of the copolymer film (or crosslinked copolymer film) was measured by means of a contact type layer thickness meter DEKTAK II (manufactured and sold by Sloan Technology Corporation, U.S.A.).

A nuclear magnetic resonance (NMR) spectrum was obtained by means of a nuclear magnetic resonance spectrometer JMN-LA400 (manufactured and sold by JEOL Ltd., Japan), using tetramethylsilane (TMS) as a standard of chemical shift, and deuterated chloroform as a solvent.

An infrared (IR) absorption spectrum was obtained by means of an infrared spectrometer IR$\mu$s (manufactured and sold by SpectraTech, Inc., U.S.A.) by transmittance measuring method using a germanium plate.

A mass spectrum was obtained by means of a mass spectrometer JMS-HX110 (manufactured and sold by JEOL Ltd., Japan) by fast atom bombardment (FAB) ionization method using glycerin or nitrobenzylalcohol as a matrix.

Reference Example 1

In order to confirm that the monomer used is copolymerized with the comonomer used, an oligomer having a molecular weight of 2000 or less was produced and the structure thereof was investigated. Hereinbelow, an explanation is made with respect to the results of the production and structure investigation.

In a 30 ml separable flask which was equipped with a tube for introducing oxygen gas and with a stirrer was charged 18 g of toluene. 1.71 g (6.94 mmol) of 2,6-diphenylphenol and 0.3 g (1.76 mmol) of 2-phenylphenol were added to the toluene and stirred under nitrogen gas stream, to thereby obtain a solution. To the obtained solution, 0.03 g of cuprous bromide, 22.8 $\mu$l of N,N,N',N'-tetramethylethylenediamine and 0.5 g of anhydrous magnesium sulfate were added, and an oxidative coupling polymerization was effected for about 30 minutes at room temperature under ambient pressure, while introducing oxygen gas from the tube, wherein the outlet of the tube was placed beneath the surface of the solution, to thereby obtain a reaction mixture.

In order to remove the insolubles, the obtained reaction mixture was subjected to filtration by means of a polytetrafluoroethylene filter (hereinbelow, referred to as "PTFE filter") having a pore size of 0.2 $\mu$m (manufactured and sold by Advantech Toyo Kaisha, Ltd., Japan), to thereby obtain a solution containing a copolymer.

The obtained solution was subjected to gel permeation chromatography (GPC) under the following conditions, and a fraction containing constituents each having a molecular weight of 2000 or less was collected.
<GPC Conditions>
Column: JAIGEL 1H, JAIGEL 2H and JAIGEL 3H (each of which is manufactured and sold by Japan Analytical Industry Co., Ltd., Japan), which are connected in series
Developing solvent: chloroform (flow rate: 3.3 ml/min.)
Apparatus: LC-908 type GPC apparatus (manufactured and sold by Japan Analytical Industry Co., Ltd., Japan)

The obtained fraction was subjected to fast atom bombardment mass spectrometry (FAB-MS) to thereby obtain a FAB-mass spectrum. The obtained FAB-mass spectrum is shown in FIG. 1. In the FAB-mass spectrum, not only the peaks due to homo-oligomers of 2,6-di-phenylphenol but also the peaks due to co-oligomers of 2,6-diphenylphenol with 2-phenylphenol are observed. This confirms that the product of the above-mentioned oxidative coupling polymerization is a copolymer of 2,6-diphenylphenol with 2-phenylphenol. Further, from this result, substantially the same copolymerization reaction as the above-mentioned oxidative coupling polymerization is considered to proceed in each of Examples 1 to 4 described below.

EXAMPLE 1

In a 500 ml separable flask which was equipped with a tube for introducing oxygen gas and with a stirrer was charged 350 g of toluene. 30 g (121.8 mmol) of 2,6-diphenylphenol and 5.18 g (30.43 mmol) of 2-phenylphenol were added to the toluene and stirred under nitrogen gas stream, to thereby obtain a solution. To the obtained solution, 0.5 g of cuprous bromide, 400 $\mu$l of N,N,N',N'-tetramethylethylenediamine and 8.72 g of anhydrous magnesium sulfate were added, and an oxidative coupling polymerization was effected for about 10 hours at 60° C. under ambient pressure, while introducing oxygen gas from the tube, wherein the outlet of the tube was placed beneath the surface of the solution, to thereby obtain a reaction mixture.

In order to remove the insolubles, the obtained reaction mixture was subjected to filtration by means of a PTFE filter having a pore size of 0.5 $\mu$m (manufactured and sold by Advantech Toyo Kaisha, Ltd., Japan), to thereby obtain a filtrate. The obtained filtrate was added dropwise to methanol, and the resultant solid material was reprecipitated and collected. 34 g of the collected solid material was dissolved in tetrahydrofuran (THF) containing 20 ml of acetic acid (300 ml in total), to thereby obtain a solution, and the obtained solution was heated under reflux for about 1 hour. After the reflux, the solution was added dropwise to methanol, and the resultant solid material was reprecipitated and collected. In order to determine the content of copper remaining in the collected solid material, a small portion of the solid material was subjected to inductively coupled plasma emission spectrometry (hereinbelow, referred to as "ICP"). As a result, the content of copper remaining in the solid material was 0.8 ppm.

34 g of the solid material was dissolved in 340 ml of THF to thereby obtain a solution, and the solution was passed through a column prepared with a cation exchange resin PK220 (manufactured and sold by Mitsubishi Chemical Corporation, Japan) and THF, to thereby obtain an eluate, and the obtained eluate was added dropwise to methanol, and the resultant solid material was reprecipitated, collected and dried at 120° C. under reduced pressure for 6 hours, to thereby obtain an aromatic copolymer. The weight (dry weight) of the obtained aromatic copolymer was 34 g (yield: 98%) That is, the aromatic copolymer which is free from gel was quantitatively obtained. The weight average molecular weight of the aromatic copolymer was about 300,000 in terms of the weight average molecular weight of polystyrene. The content of copper remaining in the aromatic copolymer, as measured by ICP, was lowered to 0.1 ppm or less.

The results of DSC analysis of the aromatic copolymer showed that the aromatic copolymer does not exhibit, in the DSC curve thereof, a crystallization peak at 240° C. and a melting peak at approximately 480° C. (each of which is exhibited by a homopolymer of 2,6-diphenylphenol in the DSC curve thereof), but only exhibits a glass transition peak at approximately 230° C. These results show that the obtained aromatic copolymer was an amorphous copolymer and, therefore, it was confirmed that the obtained aromatic copolymer was a copolymer of 2,6-diphenylphenol with 2-phenylphenol.

The temperature at which the loss in weight of the aromatic copolymer on heating reached 5% was 540° C., and the loss in weight of the aromatic copolymer after isothermal heating at 400° C. for 2 hours was 1.2%.

The amounts of recurring 2,6-diphenylphenol units and oxy-2-phenylphenylene monomer units, which were calculated from the ratio of the intensities of the peaks in the $^{13}$C-NMR spectrum which are specific for the recurring 2,6-diphenylphenol units to the intensities of the peaks in the $^{13}$C-NMR spectrum which are specific for the oxy-2-phenylphenylene monomer units, are 85% and 15% by weight, respectively, based on the weight of the aromatic copolymer.

EXAMPLE 2

In a 300 ml separable flask which was equipped with a tube for introducing oxygen gas and with a stirrer was charged 160 ml of o-dichlorobenzene, 0.288 g of cuprous bromide, 0.284 g of N,N,N',N'-tetramethylethylenediamine and 5.0 g of anhydrous magnesium sulfate, and the obtained mixture was stirred at room temperature. Then, oxygen gas was introduced into the mixture from the tube for 5 minutes, wherein the outlet of the tube was placed beneath the surface of the solution, and the introduction of oxygen gas was stopped. Subsequently, 15.8 g (0.064 mol) of 2,6-diphenylphenol and 2.72 g (0.016 mol) of 2-phenylphenol were added to the mixture, and an oxidative coupling polymerization was effected for about 5 hours at 40° C., to thereby obtain a reaction mixture.

In order to remove the insolubles, the obtained reaction mixture was subjected to filtration by means of a PTFE filter having a pore size of 0.5 μm (manufactured and sold by Advantech Toyo Kaisha, Ltd., Japan), to thereby obtain a filtrate. The obtained filtrate was added dropwise to methanol, and the resultant solid material was reprecipitated and collected. This procedure was repeated one more time for purification, and the resultant solid material was dried at 120° C. under reduced pressure for 6 hours, to thereby obtain an aromatic copolymer. The weight (dry weight) of the obtained aromatic copolymer was 17.3 g (yield: 98%). That is, the aromatic copolymer which is free from gel was quantitatively obtained.

The amounts of recurring 2,6-diphenylphenol units and oxy-2-phenylphenylene monomer units, which were calculated from the ratio of the intensities of the peaks in the $^{13}$C-NMR spectrum which are specific for the recurring 2,6-diphenylphenol units to the intensities of the peaks in the $^{13}$C-NMR spectrum which are specific for the oxy-2-phenylphenylene monomer units, are 87 and 13% by weight, respectively, based on the weight of the aromatic copolymer. The weight average molecular weight of the aromatic copolymer was about 20,000 in terms of the weight average molecular weight of polystyrene.

EXAMPLE 3

In a 500 ml separable flask which was equipped with a tube for introducing oxygen gas and with a stirrer was charged 350 g of toluene. 22.5 g (91.34 mmol) of 2,6-diphenylphenol and 10.37 g (60.89 mmol) of 2-phenylphenol were added to the toluene and stirred under nitrogen gas stream, to thereby obtain a solution. To the obtained solution, 0.5 g of cuprous bromide, 400 μl of N,N,N',N'-tetramethylethylenediamine and 8.72 g of anhydrous magnesium sulfate were added, and an oxidative coupling polymerization was effected for about 10 hours at 60° C., while introducing oxygen gas from the tube, wherein the outlet of the tube was placed beneath the surface of the solution, to thereby obtain a reaction mixture.

In order to remove the insolubles, the obtained reaction mixture was subjected to filtration by means of a PTFE filter having a pore size of 0.5 μm (manufactured and sold by Advantech Toyo Kaisha, Ltd., Japan), to thereby obtain a filtrate. The obtained filtrate was added dropwise to methanol, and the resultant solid material was reprecipitated and collected. This procedure was repeated one more time for purification, and the resultant solid material was dried at 120° C. under reduced pressure for 6 hours, to thereby obtain an aromatic copolymer. The weight (dry weight) of the obtained aromatic copolymer was 31 g (yield: 98%). That is, the aromatic copolymer which is free from gel was quantitatively obtained.

The amounts of recurring 2,6-diphenylphenol units and oxy-2-phenylphenylene monomer units, which were calculated from the ratio of the intensities of the peaks in the $^{13}$C-NMR spectrum which are specific for the recurring 2,6-diphenylphenol units to the intensities of the peaks in the $^{13}$C-NMR spectrum which are specific for the oxy-2-phenylphenylene monomer units, are 70 and 30% by weight, respectively, based on the weight of the aromatic copolymer. The weight average molecular weight of the aromatic copolymer was about 150,000 in terms of the weight average molecular weight of polystyrene.

EXAMPLE 4

In a 100 ml separable flask which was equipped with a tube for introducing oxygen gas and with a stirrer was charged 18 g of toluene. 1.07 g (4.35 mmol) of 2,6-diphenylphenol and 0.63 g (4.35 mmol) of α-naphthol were added to the toluene and stirred under nitrogen gas stream, to thereby obtain a solution. To the obtained solution, 0.03 g of cuprous bromide, 22.8 μl of N,N,N',N'-tetramethylethylenediamine and 0.5 g of anhydrous magnesium sulfate were added, and an oxidative coupling polymerization was effected for about 8 hours at 80° C., while introducing oxygen gas from the tube, wherein the outlet of the tube was placed beneath the surface of the solution, to thereby obtain a reaction mixture.

In order to remove the insolubles, the obtained reaction mixture was subjected to filtration by means of a PTFE filter having a pore size of 0.5 μm (manufactured and sold by Advantech Toyo Kaisha, Ltd., Japan), to thereby obtain a filtrate. The obtained filtrate was added dropwise to methanol, and the resultant solid material was reprecipitated and collected. This procedure was repeated one more time for purification, and the resultant solid material was dried at 120° C. under reduced pressure for 6 hours, to thereby obtain an aromatic copolymer. The weight (dry weight) of the obtained aromatic copolymer was 1.6 g (yield: 94%). That is, the copolymer, which is free from gel and soluble in an aromatic solvent, was quantitatively obtained.

The amounts of recurring 2,6-diphenylphenol units and α-oxynaphthylene monomer units, which were calculated from the ratio of the intensities of the peaks in the $^{13}$C-NMR spectrum which are specific for the recurring 2,6-diphenylphenol units to the intensities of the peaks in the $^{13}$C-NMR spectrum which are specific for the α-oxynaphthylene monomer units, are 58 and 42% by weight, respectively, based on the weight of the aromatic copolymer. The weight average molecular weight of the aromatic copolymer was about 80,000 in terms of the weight average molecular weight of polystyrene.

EXAMPLE 5

2 g of the aromatic copolymer obtained in Example 1 was dissolved in 20 g of anisole, and the resultant solution was cast on a glass plate and dried, to thereby obtain a film having a thickness of 80 μm. The obtained film was annealed at 400° C. for 1 hour in an atmosphere of nitrogen gas. DSC analysis of the film after annealing (hereinbelow, referred to as "annealed film") showed that the glass transition temperature of the annealed film was 320° C., which is higher than the glass transition temperature (230° C.) of the film before annealing.

When the annealed film was immersed in N-methylpyrrolidone, the annealed film was slightly swelled, but the appearance of the annealed film was not changed. The amount of the matter dissolved in the N-methylpyrrolidone from the annealed film (calculated from the weight of the annealed film before immersion and the weight of the annealed film after immersion) was only 3% by weight.

The temperature at which the loss in weight of the annealed film on heating reached 5% was 540° C.

EXAMPLE 6

2 g of the aromatic copolymer obtained in Example 1 and 0.3 g of 2,3-dimethyl-2,3-diphenylbutane was dissolved in 20 g of anisole, and the resultant solution was cast on a glass plate and dried, to thereby obtain a film having a thickness of 80 μm. The obtained film was annealed at 400° C. for 1 hour in an atmosphere of nitrogen gas. DSC analysis of the resultant annealed film showed that the annealed film does not undergo glass transition at a temperature of 500° C. or less.

When the annealed film was immersed in N-methylpyrrolidone, the appearance of the annealed film was not changed. The amount of the matter dissolved in the N-methylpyrrolidone from the annealed film, which was calculated in the same manner as in Example 5, was only 0.2% by weight.

The temperature at which the loss in weight of the annealed film on heating reached 5% was 553° C. The loss in weight of the annealed film after 1 hour isothermal heating at 400° C. was evaluated as follows. It was confirmed by the above results that the heat resistance of the annealed film was improved by the use of the radical initiator.

EXAMPLE 7

Substantially the same procedure as in Example 6 was repeated, except that 0.3 g of dibenzyl was used as a radical initiator.

DSC analysis of the resultant annealed film showed that the annealed film does not undergo glass transition at a temperature of 500° C. or less.

When the annealed film was immersed in N-methylpyrrolidone, the appearance of the annealed film was not changed. The amount of the matter dissolved in the N-methylpyrrolidone from the annealed film, which was calculated in the same manner as in Example 5, was only 0.2% by weight.

The temperature at which the loss in weight of the annealed film on heating reached 5% was 553° C. It was confirmed by the above results that the heat resistance of the annealed film was improved by the use of the radical initiator.

EXAMPLE 8

Substantially the same procedure as in Example 6 was repeated, except that benzoyl peroxide was used as a radical initiator.

DSC analysis of the resultant annealed film showed that the annealed film does not undergo glass transition at a temperature of 500° C. or less.

When the annealed film was immersed in N-methylpyrrolidone, the appearance of the annealed film was not changed. The amount of the matter dissolved in the N-methylpyrrolidone from the annealed film, which was calculated in the same manner as in Example 5, was only 0.8% by weight.

The temperature at which the loss in weight of the annealed film on heating reached 5% was 540° C.

EXAMPLE 9

0.9 g of the aromatic copolymer obtained in Example 1 and 0.1 g of 2,3-dimethyl-2,3-diphenylbutane was dissolved in 15 g of cyclohexanone to thereby obtain a solution.

An aluminum-coated silicon substrate was coated with the obtained solution by spin coating at a revolution speed of 3000 rpm for 30 seconds, and dried for curing at 400° C. for 1 hour, thereby obtaining a film having a thickness of 0.98 μm on the substrate.

Aluminum electrodes were provided on the obtained film and the dielectric constant of the film was determined. The dielectric constant of the film at 1 MHz was 2.80.

When the film on the substrate was immersed in N-methylpyrrolidone for 1 hour, followed by drying, the thickness of the film was not changed.

EXAMPLE 10

0.3 g of the aromatic copolymer obtained in Example 1 and 0.03 g of 2,3-dimethyl-2,3-diphenylbutane was dissolved in a mixed solvent of 1.5 g of mesitylene and 0.167 g of propylene glycol-1-monomethylether-2-acetate to thereby obtain a solution.

An aluminum-coated silicon substrate was coated with the obtained solution by spin coating at a revolution speed of 3000 rpm for 30 seconds, and dried for curing at 400° C. for 1 hour, thereby obtaining a film having a thickness of 0.7 μm on the substrate.

Aluminum electrodes were provided on the obtained film and the dielectric constant of the film was determined. The dielectric constant of the film at 1 MHz was 2.82.

When the film on the substrate was immersed in N-methylpyrrolidone for 1 hour, followed by drying, the thickness of the film was not changed.

EXAMPLE 11

0.9 g of the aromatic copolymer obtained in Example 3 and 0.1 g of benzoyl peroxide was dissolved in a mixed solvent of 1.5 g of cyclohexanone and 0.167 g of ethyl lactate to thereby obtain a solution.

An aluminum-coated silicon substrate was coated with the obtained solution by spin coating at a revolution speed of 3000 rpm for 30 seconds, and dried for curing at 400° C. for 1 hour, thereby obtaining a film having a thickness of 0.8 μm on the substrate.

Aluminum electrodes were provided on the obtained film and the dielectric constant of the film was determined. The dielectric constant of the film at 1 MHz was 2.80.

When the film on the substrate was immersed in N-methylpyrrolidone for 1 hour, followed by drying, the thickness of the film was not changed.

EXAMPLE 12

0.3 g of the aromatic copolymer obtained in Example 1 and 0.03 g of 2,3-dimethyl-2,3-diphenylbutane was dissolved in a mixed solvent of 1.5 g of mesitylene and 0.167 g of propylene glycol-1-monomethylether-2-acetate to thereby obtain a solution.

An aluminum-coated silicon substrate was coated with the obtained solution by spin coating at a revolution speed of 3000 rpm for 30 seconds, and dried for curing at 400° C. for 1 hour, thereby obtaining a film having a thickness of 0.7 μm on the substrate.

Six cuts, which are arranged in parallel at intervals of 2 mm, were formed on the film on the substrate by means of a cutter, and another set of six cuts, which are arranged in parallel at intervals of 2 mm, were formed on the film on the substrate, wherein the former and latter cuts crossed with right angles.

The film (having thereon twelve cuts in total) was immersed in water at 100° C. for 1 hour together with the substrate, and taken out from water. The water on the film was removed by means of tissue paper and the weight of the film was measured. It was found that the weight change of the film was 0.5%, based on the weight of the film before immersed in water.

The above-mentioned film (after the immersion in water) was dried by means of a vacuum drier at 130° C. under reduced pressure for 1 hour. The state of the film was not changed at all.

A piece of Scotch Clear Tape CK-24 (manufactured and sold by 3M Company, U.S.A.) was stuck on the above-mentioned dried film, and was torn off from the film. However, the film on the silicon substrate (having thereon a patterned aluminum circuit) did not come off from the silicon substrate.

EXAMPLE 13

0.3 g of the aromatic copolymer obtained in Example 1 and 0.03 g of 2,3-dimethyl-2,3-diphenylbutane was dissolved in a mixed solvent of 1.5 g of mesitylene and 0.167 g of propylene glycol-1-monomethylether-2-acetate to thereby obtain a solution.

A silicon substrate (having thereon a 0.3 μm line-and-space patterned aluminum circuit) was coated with the obtained solution by spin coating at a revolution speed of 3000 rpm for 30 seconds, and dried for curing at 400° C. for 1 hour, thereby obtaining a film on the substrate.

The obtained film was cut together with the substrate, and the sections of the film and substrate were observed by means of a scanning electron microscope (SEM). The observation showed that the aromatic copolymer was completely embedded in extremely fine grooves each having a circuit width of only 0.3 μm.

Comparative Example 1

In a 300 ml separable flask which was equipped with a tube for introducing oxygen gas and with a stirrer was charged 126.2 g of toluene. 15 g (60.9 mmol) of 2,6-diphenylphenol was added to the toluene and stirred under nitrogen gas stream, to thereby obtain a solution. To the obtained solution, 0.21 g of cuprous bromide, 159.8 μl of N,N,N',N'-tetramethylethylenediamine and 3.5 g of anhydrous magnesium sulfate were added, and an oxidative coupling polymerization was effected for about 9 hours at 70° C. under ambient pressure, while introducing oxygen gas from the tube, wherein the outlet of the tube was placed beneath the surface of the solution, to thereby obtain a reaction mixture.

In order to remove the insolubles, the obtained reaction mixture was subjected to filtration by means of a PTFE filter having a pore size of 0.5 μm (manufactured and sold by Advantech Toyo Kaisha, Ltd., Japan), to thereby obtain a filtrate. The obtained filtrate was added dropwise to methanol, and the resultant solid material was reprecipitated and collected. This procedure was repeated one more time for purification, and the resultant solid material was dried at 120° C. under reduced pressure for 6 hours, to thereby obtain a homopolymer of 2,6-diphenylphenol. The weight (dry weight) of the obtained homopolymer was 14 g (yield: 93.3%). That is, the homopolymer which is free from gel was quantitatively obtained. The weight average molecular weight of the obtained homopolymer was about 300,000 in terms of the weight average molecular weight of polystyrene.

The results of DSC analysis of the obtained homopolymer showed that the homopolymer is a crystalline polymer which exhibits a glass transition temperature of approximately 230° C., a crystallization temperature of 240° C. and a melting peak of 480° C.

0.3 g of the obtained homopolymer was dissolved in a mixed solvent of 1.5 g of cyclohexanone and 0.167 g of propylene glycol-1-monomethylether-2-acetate to thereby obtain a solution.

A silicon substrate was coated with the obtained solution by spin coating at a revolution speed of 3000 rpm for 30 seconds, to thereby obtain a film on the substrate. The obtained film was annealed at 400° C. for 1 hour, and observed by means of a SEM. The observation showed that the film was crazed due to the progress of the crystallization of the homopolymer.

Comparative Example 2

In a 500 ml separable flask which was equipped with a tube for introducing oxygen gas and with a stirrer was charged 350 g of toluene. 30 g (121.8 mmol) of 2,6-diphenylphenol and 3.72 g (30.43 mmol) of 2,6-dimethylphenol were added to the toluene and stirred under nitrogen gas stream, to thereby obtain a solution. To the obtained solution, 0.5 g of cuprous bromide, 400 μof N,N, N',N'-tetramethylethylenediamine and 8.72 g of anhydrous magnesium sulfate were added, and an oxidative coupling polymerization was effected for about 10 hours at 60° C., while introducing oxygen gas from the tube, wherein the outlet of the tube was placed beneath the surface of the solution, to thereby obtain a reaction mixture.

In order to remove the insolubles, the obtained reaction mixture was subjected to filtration by means of a PTFE filter having a pore size of 0.5 μm (manufactured and sold by Advantech Toyo Kaisha, Ltd., Japan), to thereby obtain a filtrate. The obtained filtrate was added dropwise to methanol, and the resultant solid material was reprecipitated and collected. This procedure was repeated one more time for purification, and the resultant solid material was dried at 120° C. under reduced pressure for 6 hours, to thereby obtain an aromatic copolymer. The weight (dry weight) of the obtained aromatic copolymer was 33 g (yield: 98%). That is, the aromatic copolymer which is soluble in a solvent was quantitatively obtained. The weight average molecular weight of the aromatic copolymer (determined by GPC) was about 150,000 in terms of the weight average molecular weight of polystyrene.

The temperature at which the loss in weight of the annealed film on heating reached 5% was 440° C. This showed that the heat resistance of this aromatic copolymer is poor, as compared to that of the aromatic copolymer of the present invention.

Industrial Applicability

The aromatic copolymer of the present invention has excellent electrical characteristics (such as a low dielectric constant), an excellent heat resistance, excellent film-forming properties, low water absorption properties and an excellent adhesion to other materials, so that the aromatic copolymer of the present invention can be advantageously used as a material for various electronic parts. Therefore, a copolymer film, which has an excellent heat resistance, excellent electrical characteristics (such as a low dielectric constant) and low water absorption properties, can be obtained from the aromatic copolymer of the present invention or a solution comprising the aromatic copolymer of the present invention.

Further, a crosslinked copolymer film, which has not only a more excellent heat resistance but also an excellent solvent resistance, can be obtained by subjecting the copolymer film to crosslinking treatment.

Each of the above-mentioned copolymer film and crosslinked copolymer film can be advantageously used as an interlayer dielectric film for an LSI multilevel interconnect, an LSI passivation film, a material for substrates for various electric or electronic parts, and the like.

What is claimed is:

1. An aromatic copolymer comprising a plurality of aromatic copolymer chains, each comprising:
(A) recurring 2,6-diphenylphenol units, each represented by the following formula (1):

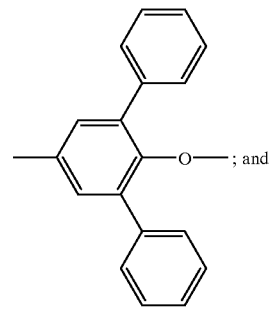

(B) phenolic comonomer units, each phenolic comonomer unit being independently selected from the group consisting of:
(i) an oxyphenylene monomer unit which is monosubstituted with a substituent selected from the group consisting of a $C_6$–$C_{18}$ monovalent aromatic group and a halogen atom,
(ii) an α-oxynaphthylene monomer unit,
(iii) a β-oxynaphthylene monomer unit, and
(iv) an oxyphenylene monomer unit which is substituted with at least one aliphatic group selected from the group consisting of a $C_1$–$C_{10}$ alkyl group, a $C_1$–$C_{10}$ alkoxy group, a $C_2$–$C_{10}$ alkenyl group and a $C_2$–$C_{10}$ alkynyl group,
wherein the amount of said recurring 2,6-diphenylphenol units (A) is from 70 to 90% by weight, based on the weight of said aromatic copolymer, and the amount of said phenolic comonomer units (B) is from 10 to 30% by weight, based on the weight of said aromatic copolymer, provided that, when said oxyphenylene monomer unit (iv) is present as the comonomer unit, the amount of said oxyphenylene monomer unit (iv) is 20% by weight or less, based on the total weight of said phenolic comonomer units (B), and
wherein said aromatic copolymer has a weight average molecular weight of from 1,000 to 3,000,000 as measured by gel permeation chromatography.

2. The aromatic copolymer according to claim 1, wherein each of said phenolic comonomer units (B) is an oxy-2-phenylphenylene monomer unit.

3. The aromatic copolymer according to claim 1 or 2, which is substantially free of gel.

4. A method for producing an aromatic copolymer of claim 1, which comprises polymerizing (a) 70 to 90% by weight of 2,6-diphenylphenol with (b) 10 to 30% by weight of at least one phenolic comonomer selected from the group consisting of:
(i') phenol which is monosubstituted with a substituent selected from the group consisting of a $C_6$–$C_{18}$ monovalent aromatic group and a halogen atom,
(ii') α-naphthol,
(iii') β-naphthol, and
(iv') phenol which is substituted with at least one aliphatic group selected from the group consisting of a $C_1$–$C_{10}$ alkyl group, a $C_1$–$C_{10}$ alkoxy group, a $C_2$–$C_{10}$ alkenyl group and a $C_2$–$C_{10}$ alkynyl group,
wherein the total amount of said 2,6-diphenylphenol (a) and said at least one phenolic comonomer (b) is 100% by weight and wherein, when said phenol (iv') is used, the amount of said phenol (iv') is 20% by weight or less, based on the weight of said at least one phenolic comonomer (b).

5. The method according to claim 4, wherein said at least one phenolic comonomer (b) is 2-phenylphenol.

6. The method according to claim 4 or 5, wherein the polymerization reaction is performed at a temperature of from 30 to 90° C.

7. The method according to claim 4 or 5, wherein the polymerization reaction is performed in the presence of a catalyst comprising a copper compound and at least one amine.

8. The method according to claim 7 wherein said catalyst is prepared by mixing said copper compound with said at least one amine, wherein the molar ratio of said copper compound to said at least one amine is from 1/2 to 2/1.

9. A copolymer solution comprising 2 to 70 parts by weight of the aromatic copolymer of claim 1 dissolved in 30 to 98 parts by weight of a solvent for said aromatic copolymer, wherein the total amount of said aromatic copolymer and said solvent is 100 parts by weight.

10. The copolymer solution according to claim 9, further comprising a radical initiator.

11. The copolymer solution according to claim 10, wherein the amount of said radical initiator is from 0.1 to 200% by weight, based on the weight of said aromatic copolymer.

12. The copolymer solution according to claim 11, wherein the amount of said radical initiator is from 5 to 30% by weight, based on the weight of said aromatic copolymer.

13. The copolymer solution according to any one of claims 10 to 12, wherein said radical initiator has a half decomposition temperature of 150° C. or higher, wherein said half decomposition temperature is defined as a temperature such that said radical initiator decomposes by 50% by weight thereof when heated in the form of a solution thereof in a solvent inert to the radical initiator at said temperature in an atmosphere of nitrogen gas under atmospheric pressure for 1 minute.

14. The copolymer solution according to claim 13, wherein said radical initiator has a half decomposition temperature of 200° C. or higher, wherein said half decomposition temperature is as defined above.

15. The copolymer solution according to any one of claims 10 to 12, wherein said radical initiator is an organic peroxide.

16. The copolymer solution according to any one of claims 10 to 12, wherein said radical initiator is a bibenzyl compound represented by the following formula (2):

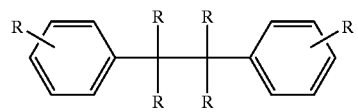
(2)

wherein each R independently represents a hydrogen atom, a $C_1$–$C_{20}$ hydrocarbon group, a cyano group, a nitro group, a $C_1$–$C_{20}$ alkoxy group or a halogen atom.

17. A copolymer film formed from the aromatic copolymer of claim 1, which has a thickness of from 0.1 to 500 $\mu$m.

18. The copolymer film according to claim 17, which is produced by a method comprising applying the copolymer solution of any one of claims 9 10, 11, 12 or 14 to a substrate, and removing the solvent from said copolymer solution.

19. A crosslinked copolymer film obtained by subjecting the copolymer film of claim 17 to crosslinking treatment.

20. The crosslinked copolymer film according to claim 19, wherein said crosslinking treatment is heat treatment at a temperature of 300° C. or higher.

21. The crosslinked copolymer film according to claim 20, wherein said heat treatment is conducted in an atmosphere of an inert gas.

22. The crosslinked copolymer film according to any one of claims 19 to 21, which does not undergo glass transition at a temperature of 300° C. or less when examined by differential scanning calorimetry (DSC).

23. The crosslinked copolymer film according to claim 22, which does not undergo glass transition at a temperature of 500° C. or less when examined by differential scanning calorimetry (DSC).

24. The crosslinked copolymer film according to any one of claims 19 to 21, which contains a non-cross-linked polymer in an amount of 5% by weight or less, based on the weight of said crosslinked copolymer film.

25. The crosslinked copolymer film according claim 24, which contains a non-crosslinked polymer in an amount of 1% by weight or less, based on the weight of said crosslinked copolymer film.

26. A circuit structure comprising a dielectric layer comprised of the copolymer film of claim 17 or the crosslinked copolymer film of any one of claims 19 to 21 and a circuit formed on said dielectric layer.

27. A semiconductor device comprising the circuit structure of claim 26.

28. A circuit board comprising the circuit structure of claim 26.

29. A semiconductor device comprising a semiconductor and a buffer film comprised of the copolymer film of claim 17 or the crosslinked copolymer film of any one of claims 19 to 21.

30. A substrate for a circuit board, comprising a porous substrate and, embedded in the pores of said porous substrate and coated on said porous substrate, the copolymer of claim 1 or 2 or a cross-linked form of said copolymer.

* * * * *